United States Patent [19]

Ito et al.

[11] Patent Number: 5,287,350
[45] Date of Patent: Feb. 15, 1994

[54] SUB-RATE TIME SWITCH

[75] Inventors: Kazuhiko Ito, Kawasaki; Kiyohiro Shimokawa; Tetsuo Ehara, both of Fukuoka, all of Japan

[73] Assignee: Fujitsu Limited, Kawasaki, Japan

[21] Appl. No.: 766,386

[22] Filed: Sep. 27, 1991

[30] Foreign Application Priority Data

Sep. 28, 1990 [JP] Japan .................................. 2-260179

[51] Int. Cl.[5] ............................................ H04Q 11/04
[52] U.S. Cl. .................................. 370/66; 370/58.1; 370/68
[58] Field of Search ................ 370/66, 60, 61, 62, 370/63, 64, 65.5, 68, 69.1, 84, 58.1

[56] References Cited

U.S. PATENT DOCUMENTS

| | | | |
|---|---|---|---|
| 4,680,752 | 7/1987 | Takemura et al. | 370/63 |
| 4,704,716 | 11/1987 | Bowers et al. | 370/63 |
| 4,884,264 | 11/1989 | Servel et al. | 370/60 |
| 5,119,368 | 6/1992 | Hiltner et al. | 370/58.1 |
| 5,146,455 | 9/1992 | Goke et al. | 370/66 |

FOREIGN PATENT DOCUMENTS 0126484 11/1984 European Pat. Off. .
0155025 9/1985 European Pat. Off. .

*Primary Examiner*—Douglas W. Olms
*Assistant Examiner*—Dang Ton
*Attorney, Agent, or Firm*—Staas & Halsey

[57] ABSTRACT

A sub-rate time switch switches a digital multiplexed signal having a basic-rate signal included in a first time slot of the digital multiplexed signal and N sub-rate signals included in a second time slot thereof where N is an integer. Each the sub-rate signals has a sub-rate which is equal to 1/N times a basic rate of the basic rate signal. A speech path memory temporarily stores the digital multiplexed signal input to the sub-rate time switch. A channel signal is read out from the speech path memory and has a plurality of channels corresponding to time slots of the digital multiplexed signal. A control part controls write and read operations of the speech path memory so that the channel signal includes N consecutive channels. Each of the N consecutive channels includes N identical sub-rate signals, and each of the N identical sub-rate signals corresponds to one of the N sub-rate signals included in the second time slot of the digital multiplexed signal.

13 Claims, 22 Drawing Sheets

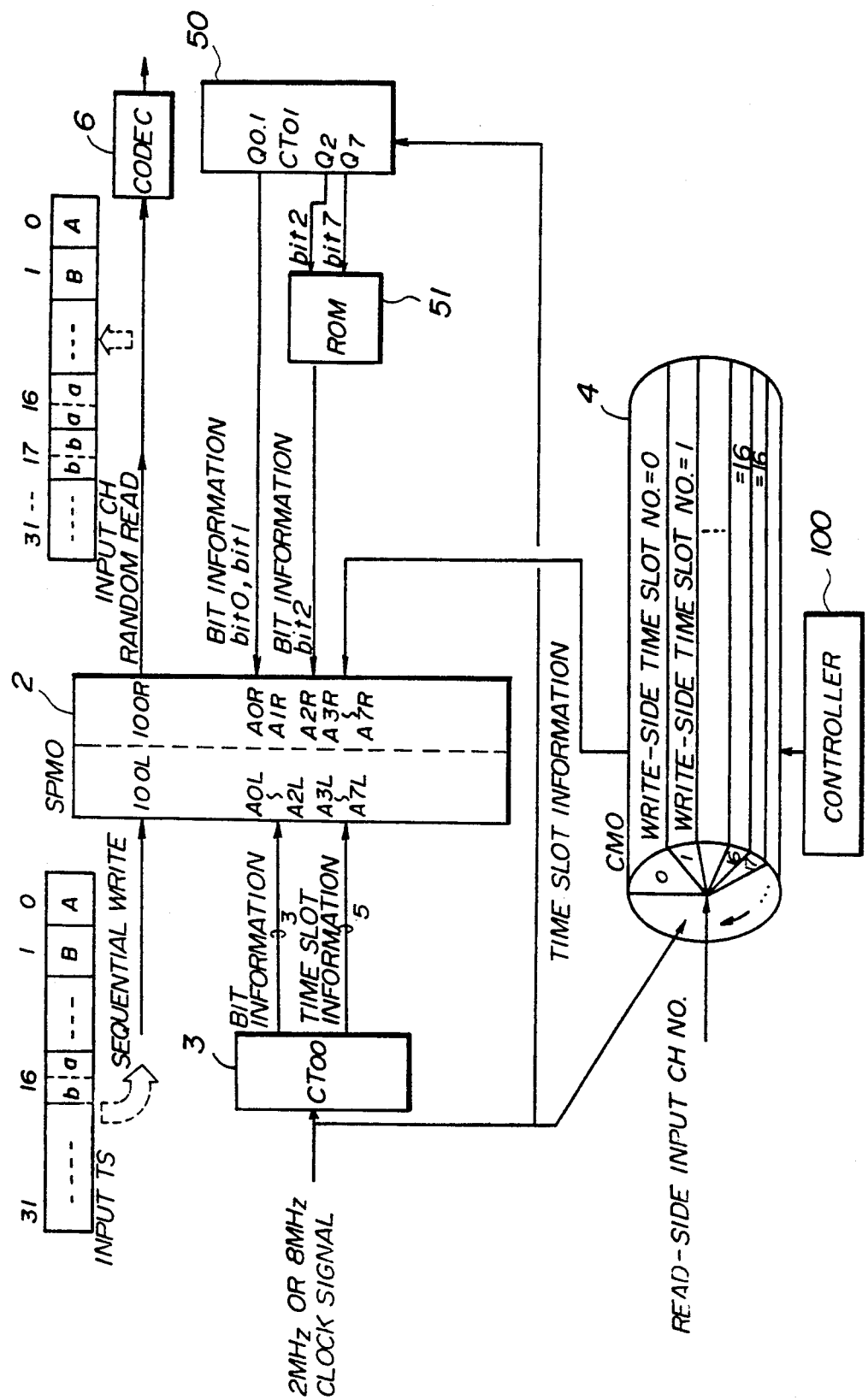

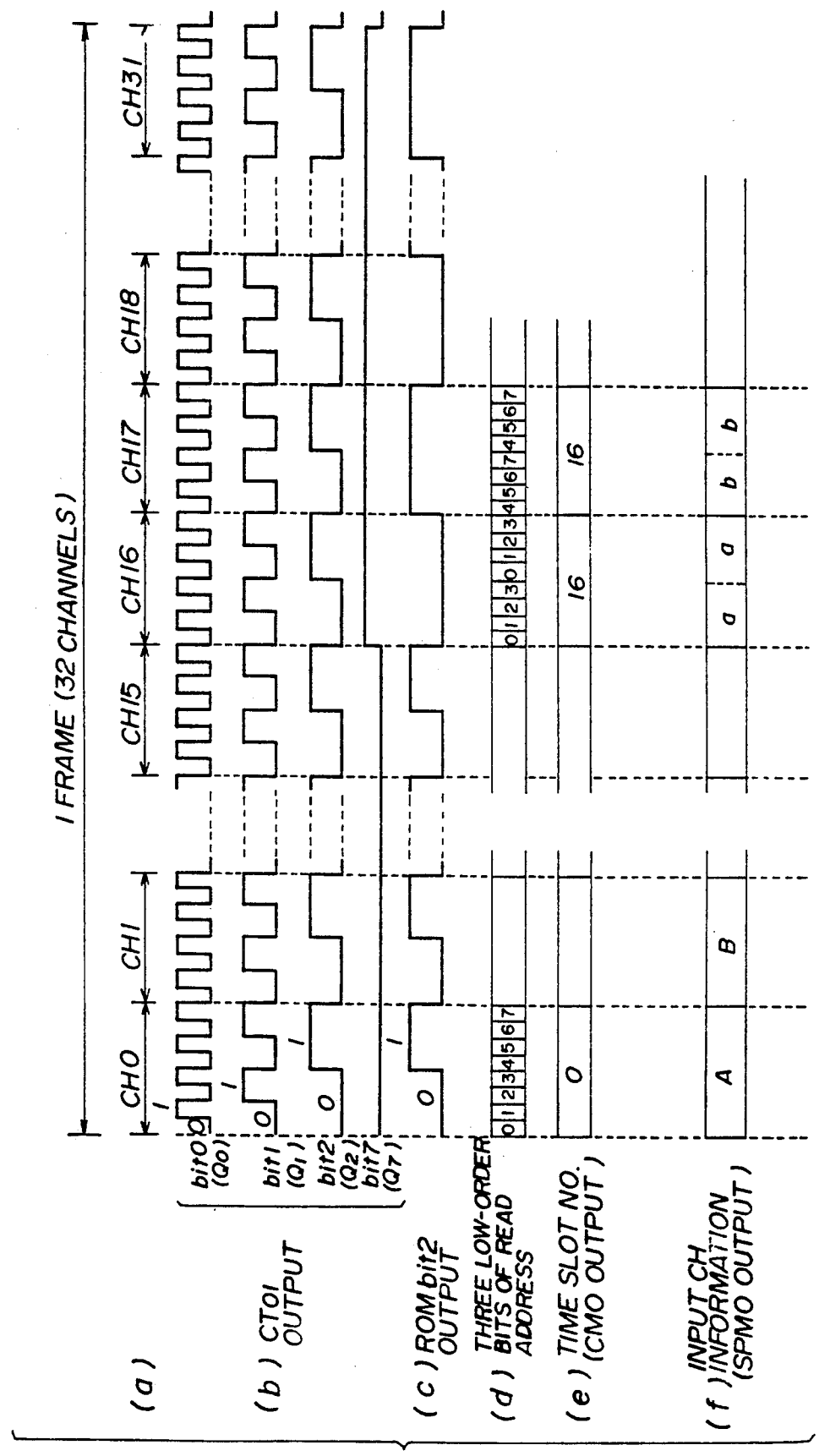

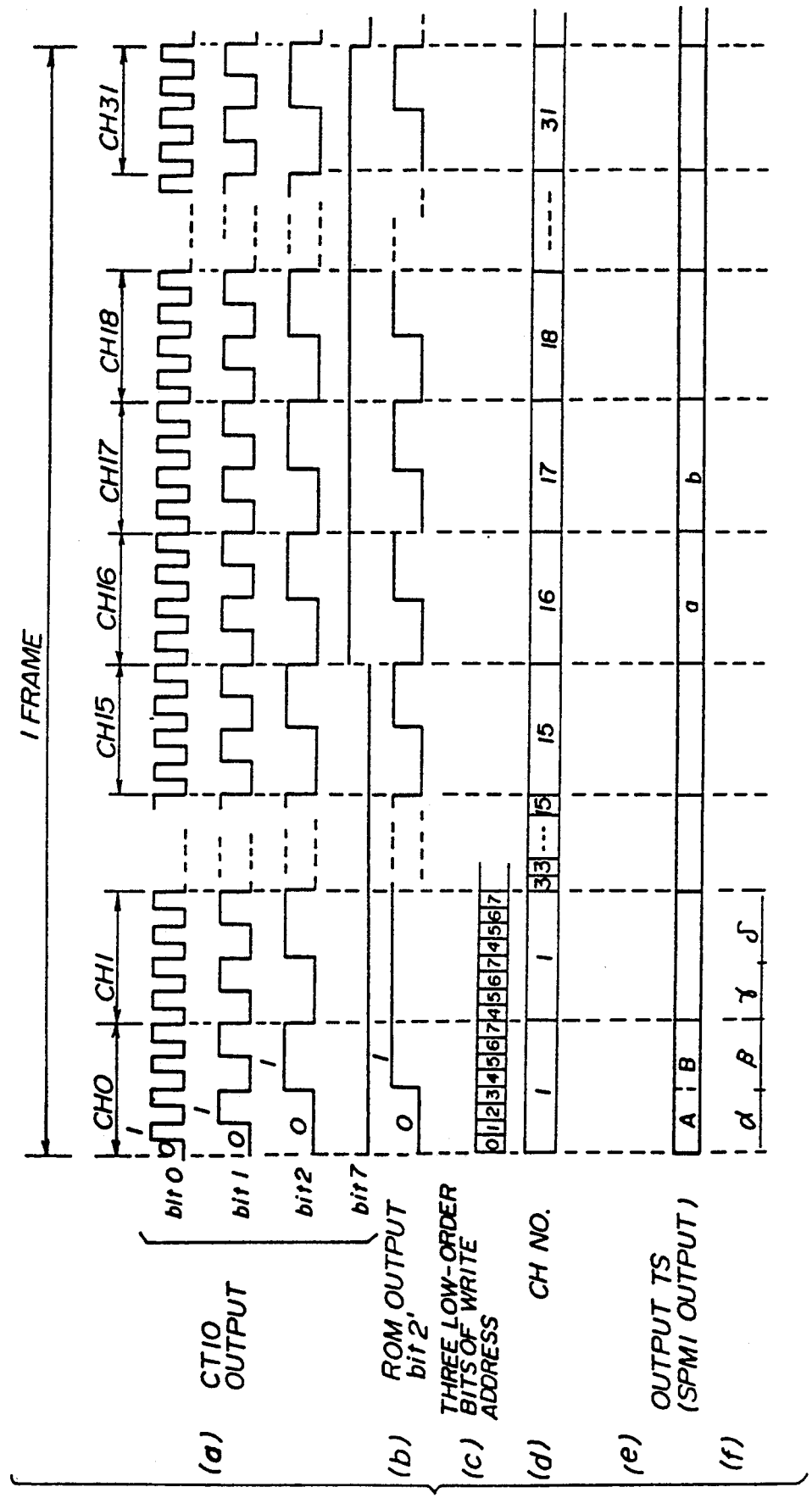

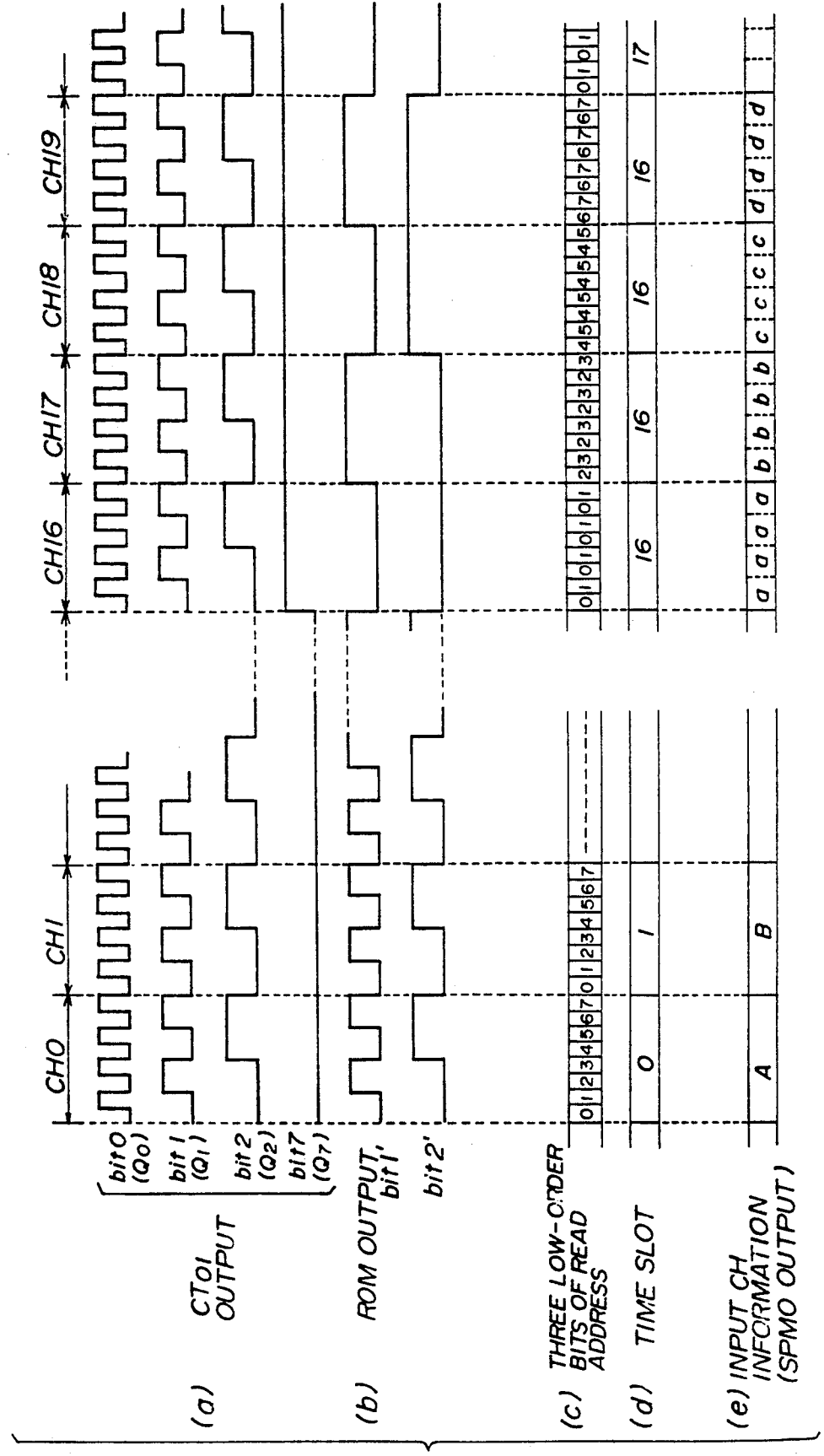

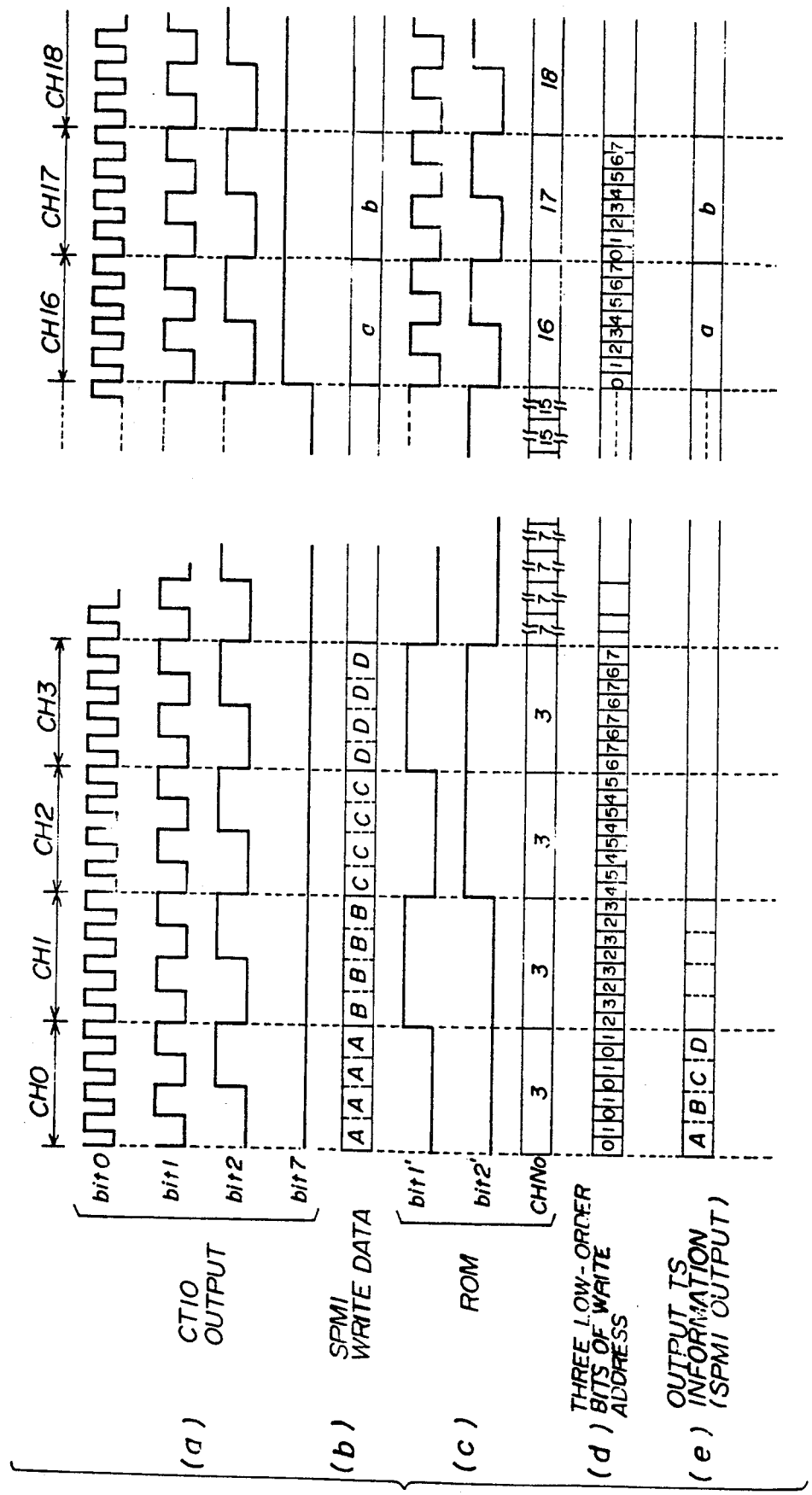

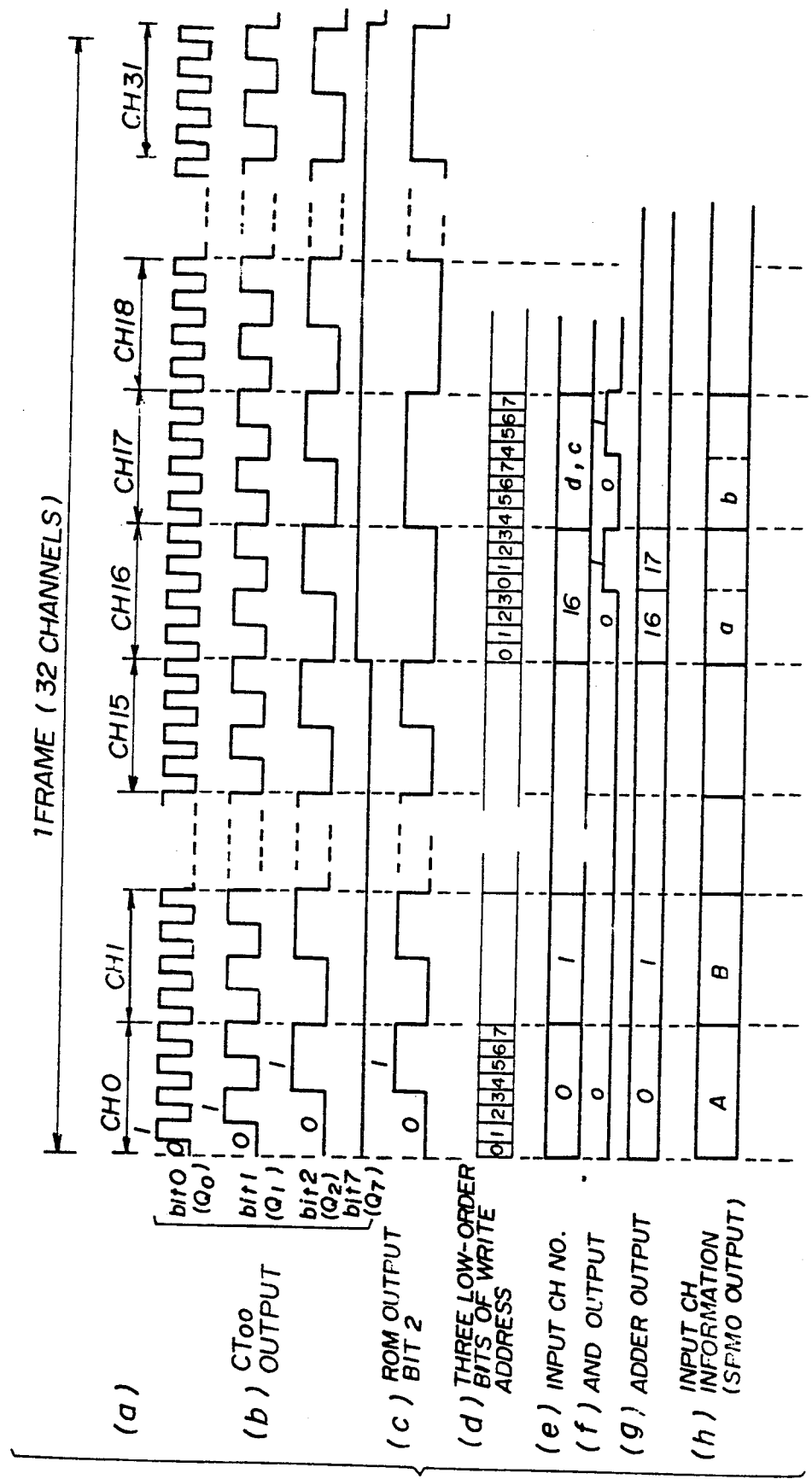

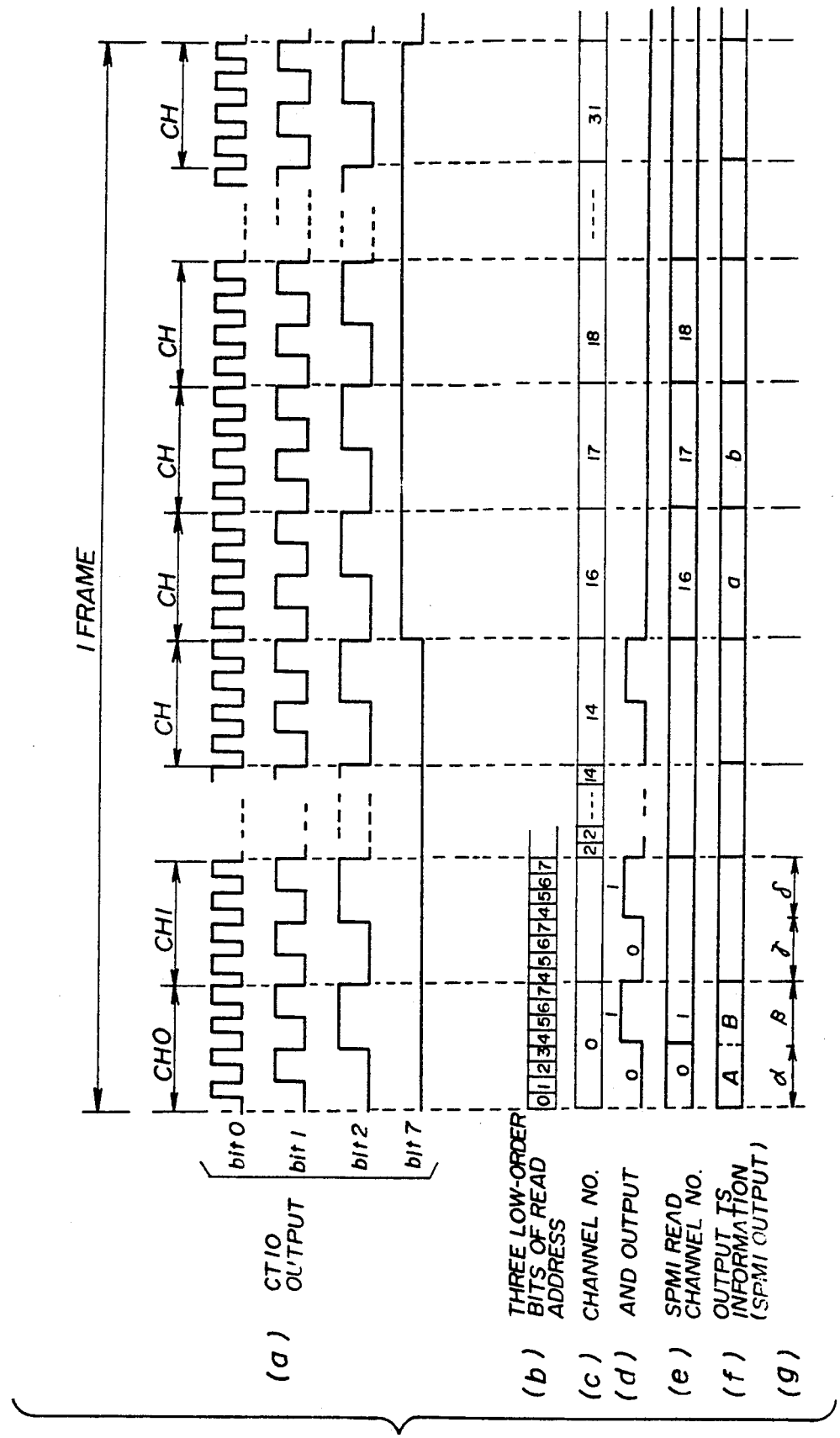

SUB-RATE TIME SWITCH

BACKGROUND OF THE INVENTION

(1) Field of the Invention

The present invention generally relates to a digital switching system, and more particularly to a sub-rate time switch which switches a digital multiplexed signal including a plurality of sub-rate signals in one time slot.

(2) Description of the Prior Art

A general switching method of a digital switching system handles 64 kbps signals. Recently, there has been considerable activity in the development of methods of compressing speech information in order to efficiently utilize digital transmission lines. In such compression methods, speech information is compressed to a sub-rate of, for example, 32 kbps, 16 kbps or 8 kbps, while a basic rate is 64 kbps. It is required that such compressed data be exchanged by a time switch which switches 64 kbps data.

Conventionally, speech information is converted to a 64 kbps PCM signal according to the CCITT recommendations. Particularly in Japan and the United States, the $\mu$-law is employed to convert the speech information into a 64 kbps signal. In the 64 kbps signal, it is necessary to transmit 8 bits every 125 $\mu$sec. For this reason, a 64 kbps switch system is generally employed.

Taking into account the recent activity in the research and development of speech compression schemes, the CCITT has issued the final recommendations about a 32 kbps ADPCM (Adaptive Differential PCM). The final recommendations have been practically used in some systems. Further, many companies have studied and proposed their own 16 kbps or 8 kbps compression schemes.

FIG. 1 shows a conventional digital exchange system which handles sub-rate signals, and FIG. 2 shows an input/output format of a codec LSI device shown in FIG. 1. Further, FIG. 3 shows the structure of a conventional 64 kbps time switch used in the system shown in FIG. 1, and FIG. 4 shows the structure of a conventional 32 kbps time switch used in the system shown in FIG. 1.

Referring to FIG. 1, the system includes a network NW including a path switch, subscriber lines 71 and 72, digital trunk (junction) lines 73 and 74 mutually connecting exchange systems, and a speech compression/-decompression multiplexing unit 75 (hereafter simply referred to a multiplexing unit). In FIG. 1, subscribers (telephone sets) A and B are connected to the network NW via respective line circuits LC, and communicate with subscribers C and D via another exchange system (not shown), respectively. Digital signals, each having a basic rate of, for example, 64 kbps, are transferred between the subscribers A and B and the network NW. Signals transferred via each of the digital trunk lines 73 and 74 respectively include two sub-rate signals in one time slot in order to efficiently utilize the digital trunk lines 73 and 74. Each sub-rate signal has a sub-rate of 32 kbps.

The multiplexing unit 75 is provided for exchanging the basic-rate signals with the sub-rate signals. On the input side of the multiplexing unit 75, 64 kbps speech signals (8-bit digital signals) sent out from the subscribers A and B are assigned to time slots "0" and "1" by the network 70. Further, 32 kbps sub-rate signals (four-bit digital signals) sent from the subscribers C and D via the digital trunk line 74 are assigned to time slot "2" by the network 70. An input time slot signal (INPUT TS) ①  having a format shown in FIG. 1 is input to the multiplexing unit 75. For the sake of convenience, one frame consists of four time slots (or channels) "0" to "3", as shown in FIG. 1.

The input time slot signal (INPUT TS) ① is changed to an input channel signal (INPUT CH) ② by a primary time switch (SW0) 76 of the multiplexing unit 75. During this process, the signals, each having the basic rate, are output to a 32 kbps ADPCM codec (CODEC) 77 without any change, while the time slot "2" including two sub-rate signals is divided so that the two sub-rate signals are placed in separate channels (CH; the same as TS). The input channel signal ② has a format shown in FIG. 2.

The input channel signal ② is input to the codec 77, which encodes each of the basic-rate signals contained therein to a sub-rate code and decodes each of the sub-rate signals to a basic-rate code. Then, the codec 77 outputs an output channel signal (OUTPUT CH) ③ having a format shown in FIG. 2. The output channel signal ③ is input to a secondary time switch 78 of the multiplexing unit 75, at which the positions of time slots are changed by a random-write/sequential read procedure of the secondary time switch 78. Then, an output time slot signal (OUTPUT TS) ④ having a format shown in FIG. 1 is produced at the output side of the multiplexing unit 75. As shown, the format of the output time slot signal ④ includes, in time slot "0", the sub-rate signals from the subscribers A and B.

The primary time switch SW0 has the function of placing the plural (two) sub-rate signals which are present in one time slot of the input time slot signal into corresponding, plural a plurality of, (two) channels of the input channel signal, and the secondary time switch SW1 has the function of placing the plural (two) sub-rate signals which are present in the output channel signal into corresponding, plural (two) channels of one time slot of the output time slot signal.

A conventional 64 kbps time switch will now be described with reference to FIG. 3. In general, an input signal which is input to the 64 kbps time switch is a multiplexed signal obtained by multiplexing 8-bit signals, each being generated for every 125 $\mu$s interval and has a frame which consists of 32 channels (time slots). The input signal is sequentially written into a speech path memory SPM (Speech Path Memory) of the 64 kbps time switch. During the write operation, write addresses are generated by a counter CT0. In FIG. 3, A0L–A2L are three low-order bits, which specify a write position (area) in which each bit in a specified input time slot is written, and A3L–A7L are five high-order bits of the counter CT0. The bits A3L–A7L specify a write position (area) corresponding to each input time slot number ("0"–"31"). The contents of the speech path memory SPM are read out therefrom at a time specified by software in the random read manner.

More specifically, a control memory CM has information about the time slots on the write side of the speech path memory SPM with respect to the time slot positions on the read side. The information about each time slot on the write side of the speech path memory SPM shows which position of the speech path memory SPM should be read. Such information can be written into the control memory CM under the software control of a controller (not shown). The time slot information on the write side is read from the control memory CM for each time slot on the read side thereof. The readout time slot information on the write side is input to the speech path memory SPM, from which data specified by the readout time slot information is read. During the above read operation, the position of each bit in each time slot is indicated by three-bit data generated and output by a counter CT1. In the above manner, data is read out from the speech path memory SPM in serial form.

In FIG. 3, each time slot, of all the time slots, has a basic-rate signal. In order to efficiently switch information having different frequency ranges, such as 64 kbps, 32 kbps, 16 kbps and 8 kbps, it is necessary for the controller (not shown) to know information about the frequency ranges.

FIG. 4 shows a conventional 32 kbps time switch capable of exchanging 64 kbps signals with 32 kbps signals in four-bit unit. The time switch shown in FIG. 4 writes the input signal in the speech path memory SPM in the sequential write manner while the write addresses are generated by the counter CT0. For example, when 32 kbps data is exchanged, the time slot number on the write side of the speech path memory SPM is placed at an address corresponding to the time slot position on the read side thereof. At this time, bit "2" is supplied, as bit information, to the speech path memory SPM. The bit "2" discriminates the first four bits "0"–"3", out of eight bits consisting of "0"–"7", from the second four bits "4"–"7". In the above manner, the time slot position of 32 kbps data (four bits) is exchanged.

When 64 kbps data (eight bits) is exchanged via the time switch shown in FIG. 4, two addresses of the control memory CM are needed because the time switch shown in FIG. 4 is designed to handle 32 kbps data (four bits). Thus, the read operation on the control memory CM must be carried out twice in order to handle 64 kbps data, and the software realizing the above-mentioned operation has a load which is twice that of the structure shown in FIG. 3.

The primary and secondary time switches SW0 and SW1 shown in FIG. 1 are formed with the time switches as shown in FIG. 4 in order to handle signals having different frequency ranges. Thus, the software of the multiplexing unit 75 has a large load.

Referring to FIG. 5, a speech path memory SPM0 and a control memory CM0 form the time switch 76 shown in FIG. 1, and a speech path memory SPM1 and a control memory CM1 form the time switch 78 shown in FIG. 1. The addresses of the control memories CM0 and CM1 which are directly handled by software are denoted by ⓪-⑦. Taking the control memory CM0 as an example, when 64 kbps data A is switched to the input channel from the input time slot, it is necessary to respectively write TS0,0 and TS0,1 in areas indicated by the addresses ⓪ and ① of the control memory CM0 because A is placed in the areas of the addresses ⓪ and ① of the speech path memory SPM0. Meanwhile, 32 kbps data 'a' is placed in an area specified by address ④ of the speech path memory SPM0, and thus TS2,0 is written into an area specified by the address ④ of the control memory CM0.

When 64 kbps data is handled by a 16 kbps time switch, the address setting by software must be carried out four times. Similarly, when 64 kbps data is handled by an 8 kbps time switch, the address setting by software must be carried out eight times.

SUMMARY OF THE INVENTION

It is a general object of the present invention to provide a sub-rate time switch in which the above disadvantages are eliminated.

A more specific object of the present invention is to provide a sub-rate time switch capable of switching data having different frequency ranges by setting the address of the control memory at one time.

The above objects of the present invention are achieved by a sub-rate time switch which switches a digital multiplexed signal having a basic-rate signal included in a first time slot of the digital multiplexed signal and N sub-rate signals included in a second time slot thereof, where N is an integer, each of the sub-rate signals having a sub-rate which is equal to 1/N times a basic rate of the basic rate signal, the sub-rate time switch comprising:

a speech path memory temporarily storing the digital multiplexed signal which is input to the sub-rate time switch, a channel signal being read out from the speech path memory and having a plurality of channels corresponding to time slots of the digital multiplexed signal; and control means, coupled to the speech path memory, for controlling write and read operations of the speech memory so that the channel signal includes N consecutive channels, each including N identical sub-rate signals, each of the N identical sub-rate signals corresponding to one of the N sub-rate signals included in the second time slot of the digital multiplexed signal.

The above-mentioned objects of the present invention are also achieved by a sub-rate time switch which switches a digital multiplexed signal having a first channel in which a basic-rate signal is positioned, and N consecutive second channels where N is an integer, each of the N consecutive second channels including N identical sub-rate signals, each of the N identical sub-rate signals having a sub-rate equal to 1/N times a basic rate of the basic rate signal, the sub-rate time switch comprising:

a speech path memory temporarily storing the digital multiplexed signal which is input to the sub-rate time switch, a time slot signal being read out from the speech path memory and having a plurality of time slots corresponding to channels of the digital multiplexed signal; and control means, coupled to the speech path memory, for controlling write and read operations of the speech path memory so that the time slot signal includes a time slot including N sub-rate signals respectively included in the N consecutive second channels.

The above-mentioned objects of the present invention are also achieved by a sub-rate time switch switching a digital multiplexed signal having a basic-rate signal included in a first time slot of the digital multiplexed signal and N sub-rate signals included in a second time slot thereof, where N is an integer, each of the sub-rate signals having a sub-rate which is equal to 1/N times a basic rate of the basic rate signal, the sub-rate time switch comprising:

a first speech path memory temporarily storing the digital multiplexed signal which is input to the sub-rate time switch, a first channel signal being read out from the speech path memory and having a plurality of channels corresponding to time slots of the digital multiplexed signal; and first control means, coupled to the first speech path memory, for controlling write and read operations of the speech path memory so that the first channel signal includes a first channel including the basic-rate signal, and N consecutive second channels, each including N identical sub-rate signals, each of the N identical sub-rate signals corresponding to one of the N sub-rate signals included in the second time slot of the digital multiplexed signal;

codec means for coding the basic-rate signal included in the first channel signal to sub-rate signals and for decoding the sub-rate signals included in the channel signal into a basic-rate signal, so that a second channel signal is output by the codec means, the second channel signal having a third channel in which a basic-rate signal is positioned, and N consecutive fourth channels, each including N identical sub-rate signals;

a second speech path memory temporarily storing the second channel signal, a time slot signal being read out from the second speech path memory and having a plurality of time slots corresponding to channels of the second channel signal; and second control means, coupled to the second speech path memory, for controlling write and read operations of the speech path memory so that the time slot signal includes a time slot including N sub-rate signals respectively included in the N consecutive fourth channels.

BRIEF DESCRIPTION OF THE DRAWINGS

Other objects, features and advantages of the present invention will become more apparent from the following detailed description when read in conjunction with the accompanying drawings, in which:

FIG. 7A is a block diagram of a primary time switch shown in FIG. 6;

FIG. 7B is a timing chart of a read operation of the primary time switch shown in FIG. 7A;

FIG. 9B is a timing chart of a write operation of the secondary switch shown in FIG. 9A;

FIG. 10B is a timing chart of a read operation of the primary time switch shown in FIG. 10A;

FIG. 11B is a timing chart of a write operation of the secondary time switch shown in FIG. 11A;

FIG. 13B is a timing chart of a write operation of the primary time switch shown in FIG. 13A;

FIG. 14B is a timing chart of a read operation of the secondary time switch shown in FIG. 14A.

DESCRIPTION OF THE PREFERRED EMBODIMENTS

Figure 1:
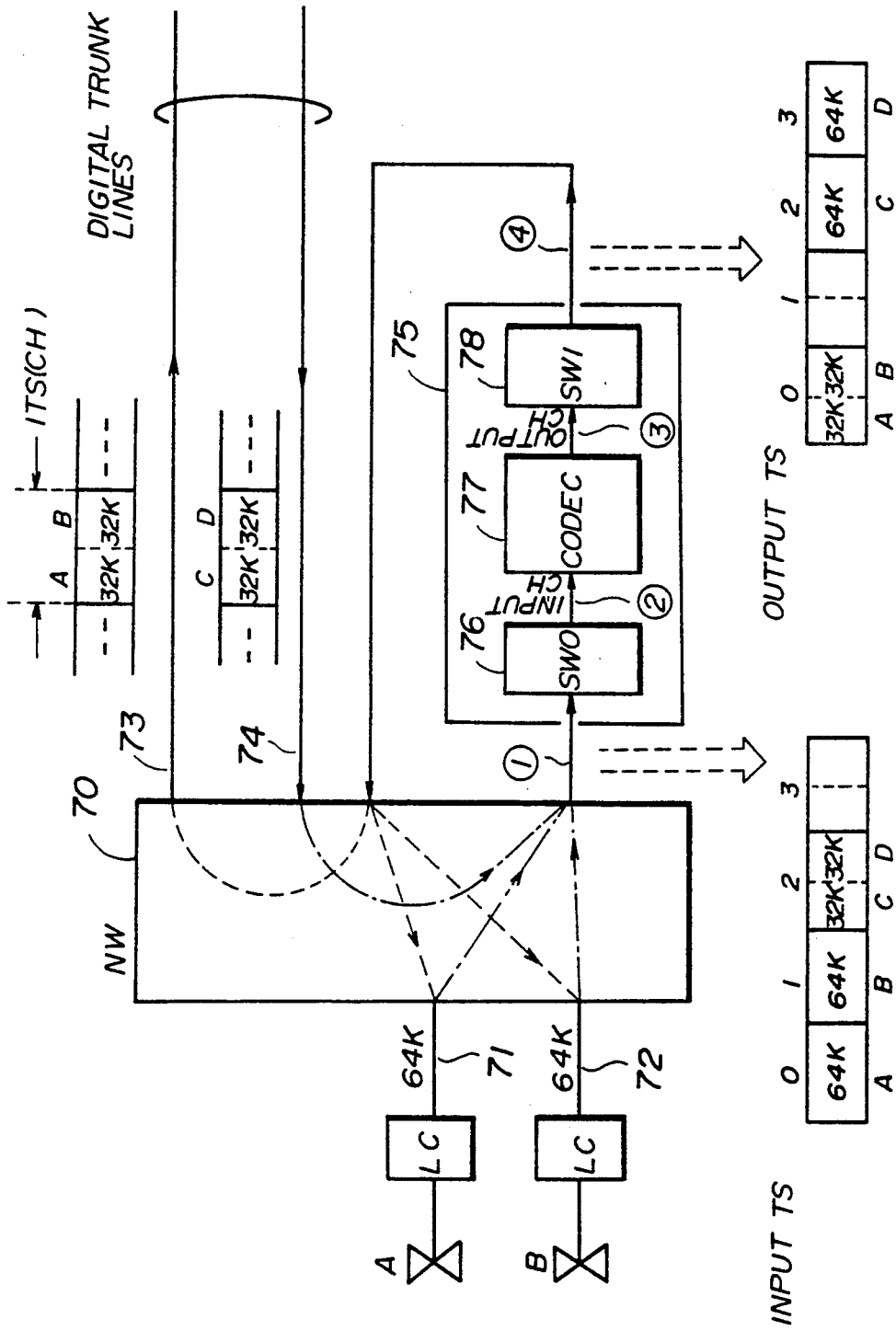
FIG. 1 is a block diagram of a conventional digital exchange system.
Figure 2:
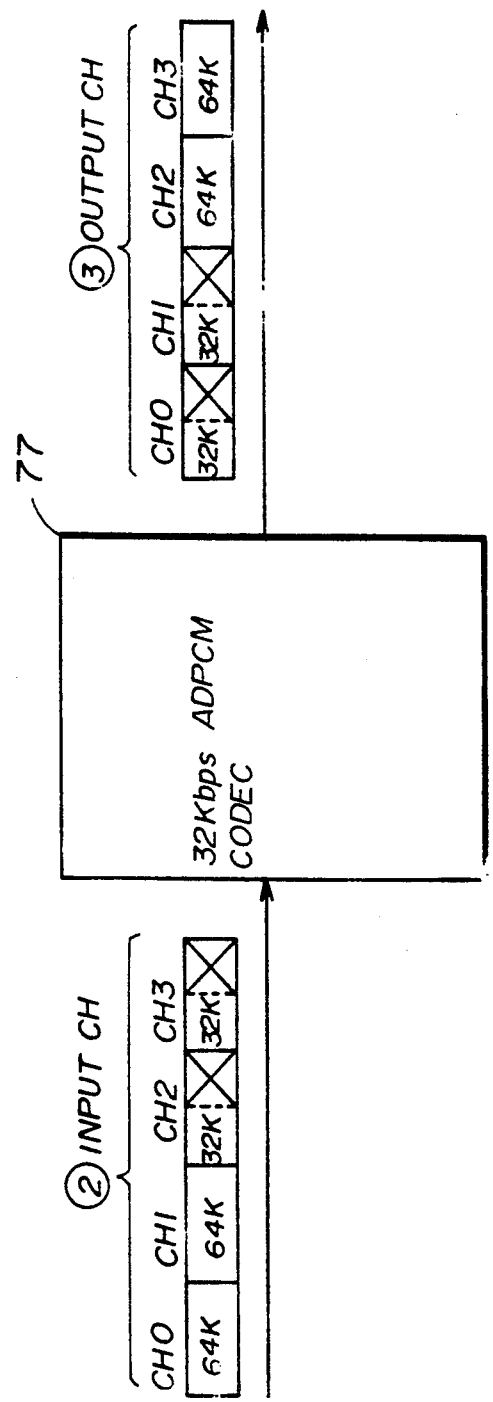
FIG. 2 is a block diagram of input and output formats of a codec LSI device used in the system shown in FIG. 1.
Figure 3:
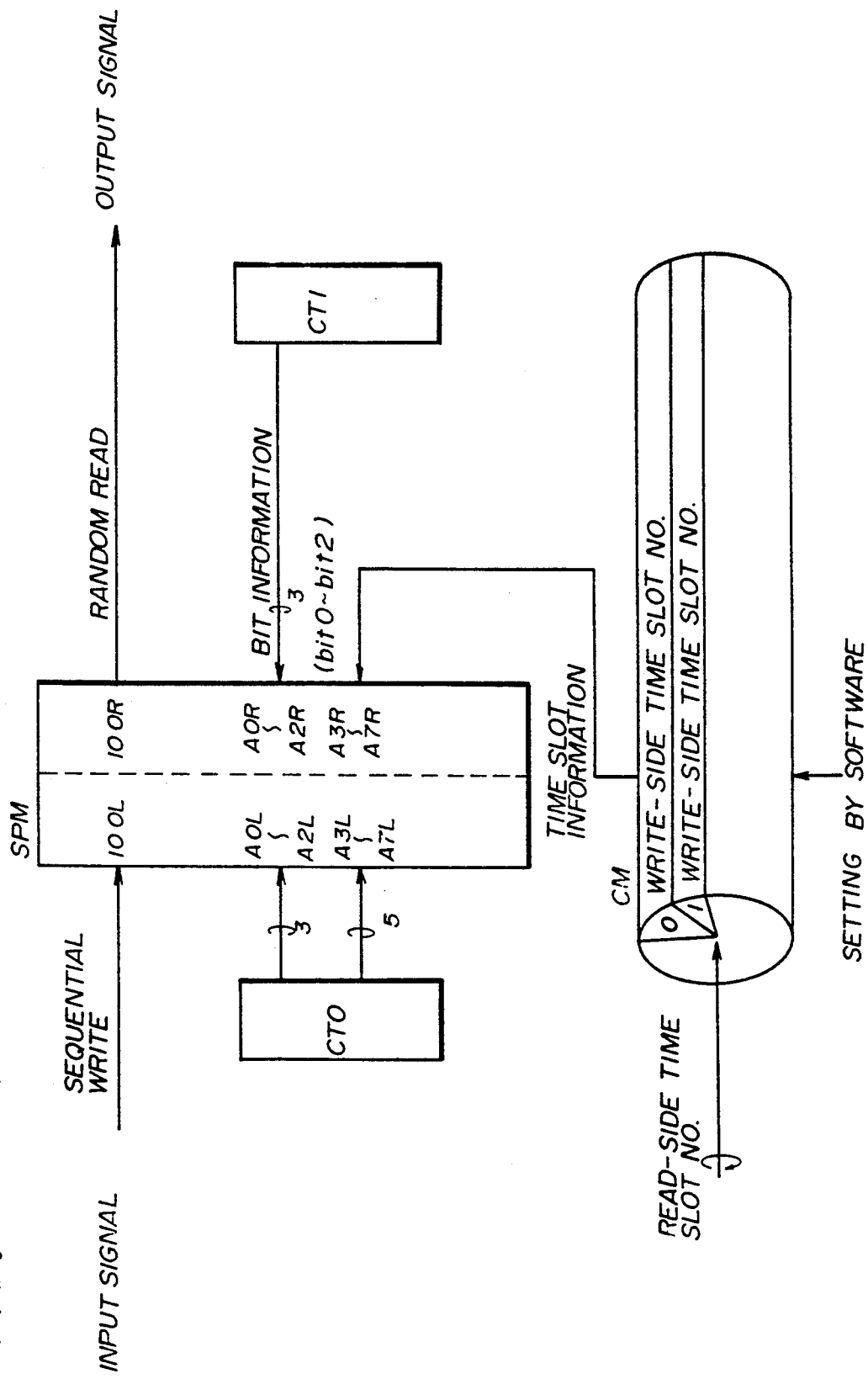
FIG. 3 is a block diagram of a conventional 64 kbps time switch.
Figure 4:
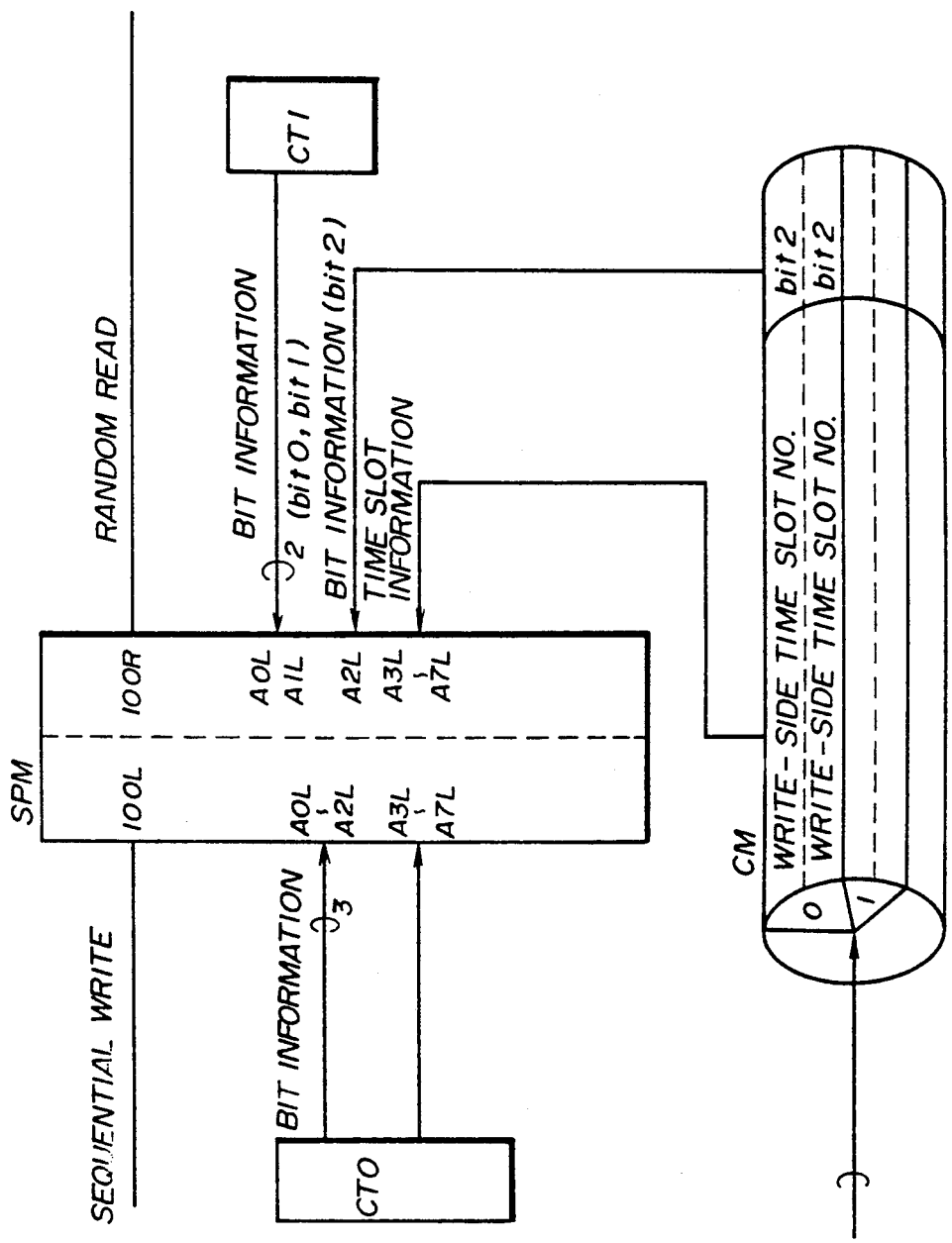
FIG. 4 is a block diagram of a conventional 32 kbps time switch.
Figure 5:
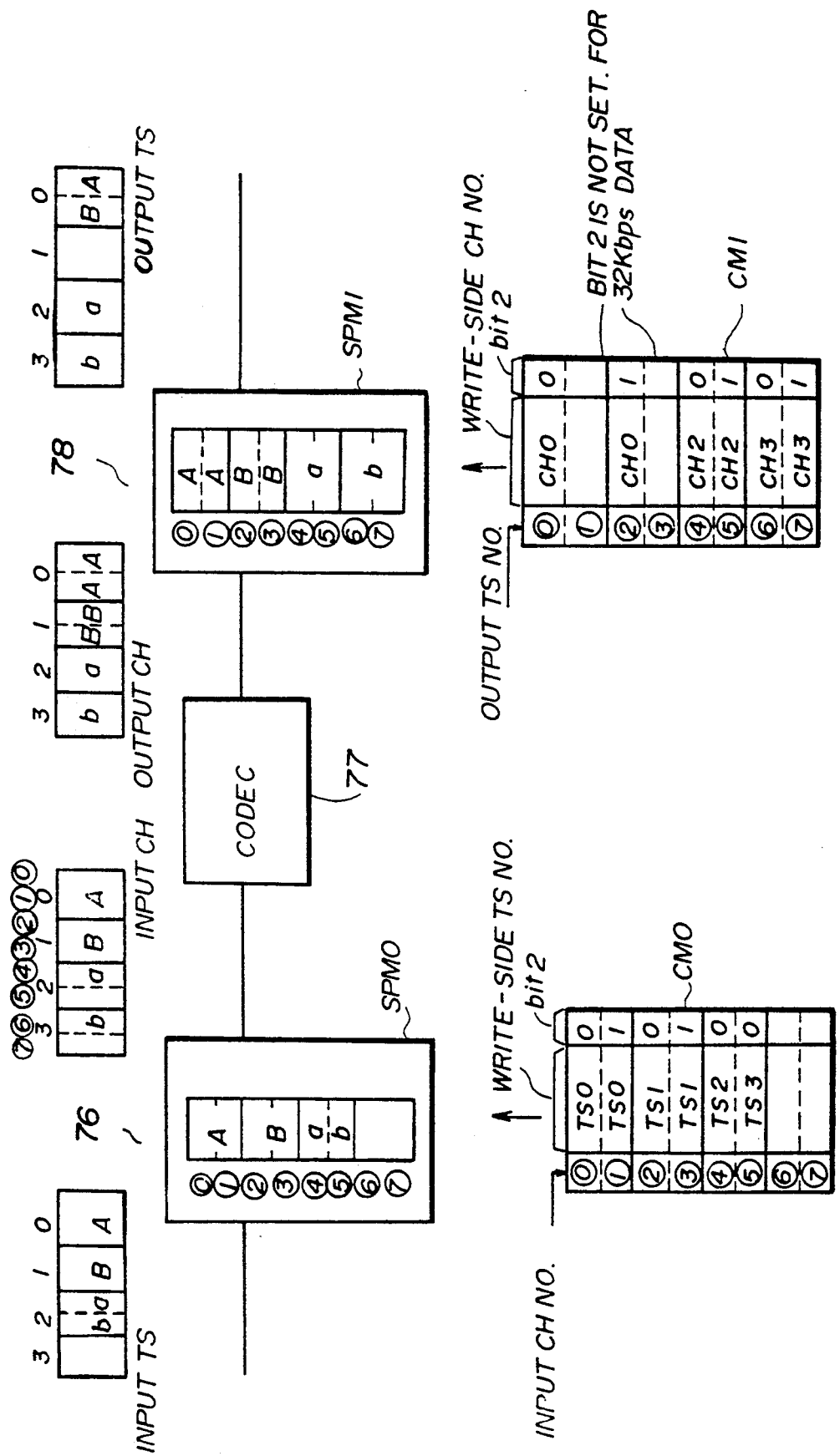
FIG. 5 is a block diagram showing the operation of a multiplexing unit shown in FIG. 1.
Figure 6:
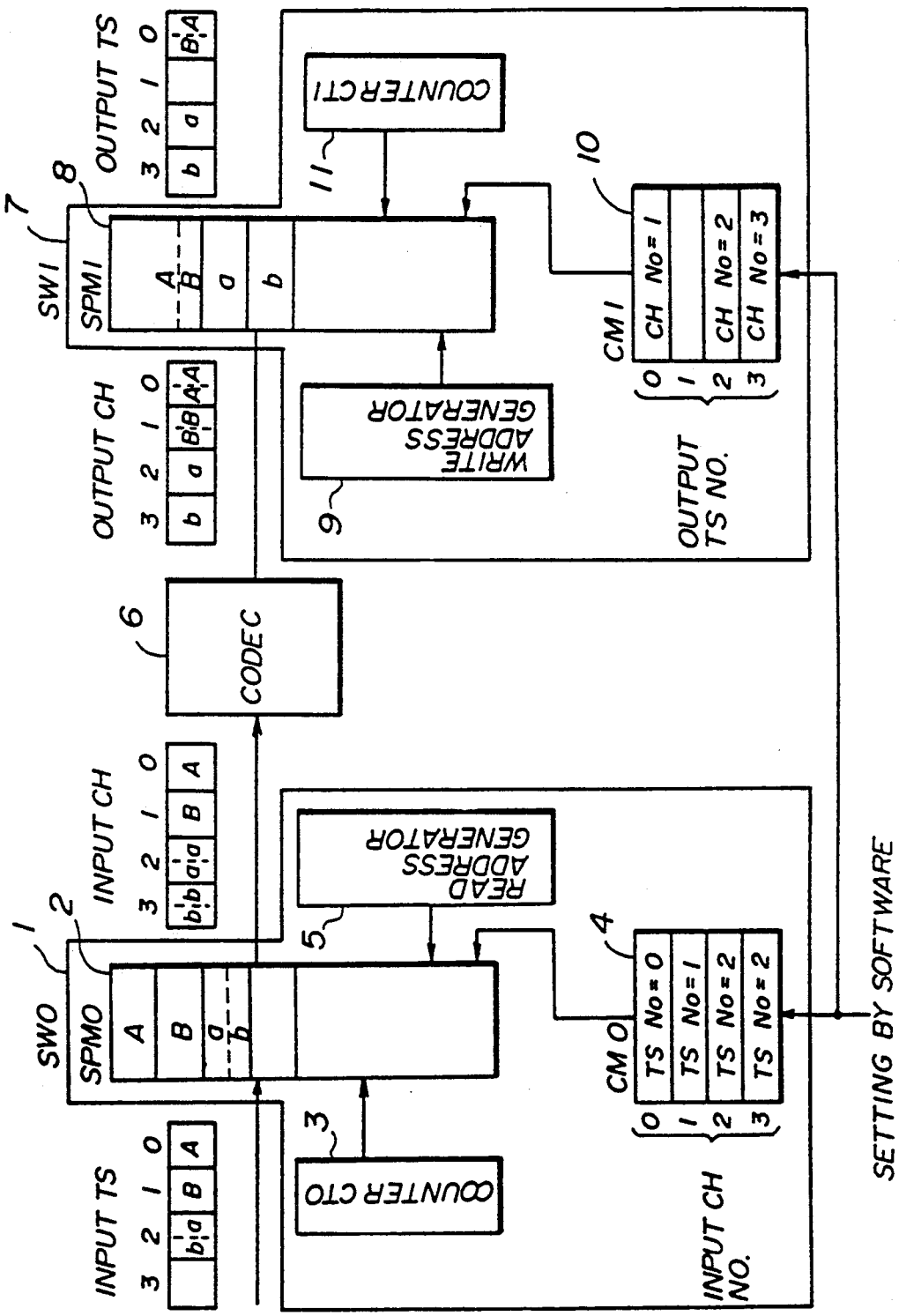
FIG. 6 is a block diagram showing an outline of a first preferred embodiment of the present invention.

FIG. 6 shows the outline of the first preferred embodiment of the present invention. A digital exchange system shown in FIG. 6 comprises a primary time switch (SWO) 1, a speech path memory (SPMO) 2, a write counter (CTO) 3, a control memory (CMO) 4, a read address generator 5, a codec (CODEC) 6, a secondary time switch (SW1) 7, a speech path memory (SPM1) 8, a write address generator 9, a control memory (CM1) 10, and a read counter (CT1) 11.

The first embodiment of the present invention handles a basic rate of 64 kbps, and a sub-rate of 32 kbps. However, the present invention is not limited to these bit rates, but includes sub-rates of, for example, 16 kbps or 8 kbps with respect to the 64 kbps basic rate.

It is now assumed that an input time slot signal ("INPUT TS") which is input to the primary time switch 1 includes time slots Plural (two) respective including basic-rate signals A and B, and a single time slot commonly including a plurality (two) sub-rate signals "a" and "b". The input time slot signal is sequentially written into the speech path memory 2. During the read operation of the speech path memory 2, a read time slot (time slot to be read) is specified by time slot information written by the software function of a controller (not shown) connected to the control memory 4, and the position of each bit of each time slot in the speech path memory 2 is specified by the read address generator 5. The read address generator 5 generates addresses specifying the bit positions so that the first four bits (data "a") in input time slot "2" having the sub-rate signals "a" and "b" are read twice during a time corresponding to the input channel number "2", and the second four bits (data "b") in the input time slot "2" are read twice during a time corresponding to the input channel number "3". In the above manner, an input channel signal ("INPUT CH") shown in FIG. 6 is output to the codec 6.

The codec 6 receives the input channel signal from the primary time switch 1 and executes coding (compression) and decoding (decompression) procedures on the input channel signal. Then, the codec 6 outputs an output channel signal ("OUTPUT CH"), which is composed of a plurality of (two) identical (i.e., an individual, corresponding) sub-rate signals in an identical channel e.g., AA in output channel "0") and a decoded (decompressed) signal in one i.e., an individual, corresponding channel (e.g., "a" in output channel "2").

The output channel signal is input to the secondary time switch 7, and written into areas of the speech path memory 8 specified by the write address generator 9. During this write operation, with respect to consecutive channels of the output channel signal, each including the identical sub-rate signals (AA in the output channel "0" and BB in the output channel "1"), the write address generator 9 generates write addresses which makes it possible to combine the sub-rate signals of the consecutive channels "0" and "1" and place combined sub-rate signals in the odd (last) channel (output channel "1") of the consecutive channels. As shown in FIG. 6, the sub-rate signals A and B are written into the area of the speech path memory SPM1 corresponding to the output channel "1".

During the read operation of the speech path memory 8, the channel numbers of the speech path memory 8 which are written into the control memory 10 by the software procedure of the controller (not shown) are sequentially read from the control memory 10, and the position of each bit contained in each channel is specified by the read counter 11. In FIG. 6, the content of the channel number "1" is read out from the control memory 10 in the time slot "0" on the output side of the speech path memory 8, and the contents of the channel numbers "2" and "3" are respectively read out therefrom in the output time slots "2" and "3".

FIG. 7A shows the primary time switch (SW0) 1 shown in FIG. 6 in detail. As shown, the read address generator 5 shown in FIG. 6 is composed of a counter 50 and a ROM (Read Only Memory) 51. An input time slot signal which is input to the speech path memory 2 consists of 32 times slots, as shown in FIG. 8. The basic-rate signals (64 kbps) are stored in the first 16 time slots, namely, time slots "0"–"15", and sub-rate signals (32 kbps) are stored in the second 16 time slots, namely, time slots "16"–"31" in such a way that two 32 kbps sub-rate signals are combined and placed in one time slot. It will be noted that the input time slot signal shown in FIG. 8 is used in the following description for the sake of simplicity, and the input time slot signal processed by the present invention is not limited to the input time slot signal shown in FIG. 8.

The input time slots are written into the speech path memory 2 in accordance with the addresses generated by the write counter 3, which is driven by a clock signal having a frequency of 2.048 MHz (=64 k×32 channels) or 8.192 MHz (equal to an integer multiple of 2.048 MHz). Hereafter, 2.048 MHz and 8.192 MHz are referred to 2 MHz and 8 MHz, respectively, for the sake of simplicity. The output signal of the write counter 3 consists of five high-order bits (32 count numerals) indicating the time slot position of the speech path memory 2, and the three low-order bits (8 count numerals) indicating the bit position thereof.

The read operation of the speech path memory 2 will now be described with reference to FIG. 7B. The time slots are sequentially read out from the speech path memory 2 in the order of the read-side channel number, that is, "0", "1", "2", .... In FIG. 7B, the input time slot number "0" on the write side of the speech path memory 2 is supplied to the speech path memory 2 from the control memory 4 during a time corresponding to the input channel number "0". During this time, three bits "0", "1" and "2" of the output signal of the counter 50 form a count numeral generated by an eight-bit counter, as shown in (d) of FIG. 7B. The ROM 51 receives the bit "7" and bit "2" from the counter 50, and generates a bit-2 signal, which is the same as the bit "2" output by the counter 50 during a time when the first 16 channels, that is, channels "0"–"15" are processed. During this time, the bit "7" output by the counter 50 is maintained at a low level, as shown in (b) of FIG. 7B. Thus, as shown in (d) of FIG. 7B, the three low-order bits of the read address change so that it increases one by one. That is, the eight bits of each of the channels "0"–"15" are sequentially addressed.

Meanwhile, when the time slot number "16" (input channel "16") is read, the time slot number "16" on the write side is read out from the control memory 4. At this time, the bit "7" output by the counter 50 is switched to a high level, and the bit "2" is maintained at "0" during a period corresponding to the eight bits, as shown in (c) of FIG. 7B. Thus, the bits "0" and "1" of the counter 50 and the bit "2" of the ROM 51 show bits "0", "1", "2" and "3" in this order in each of the first and second halves of one channel, as shown in (d) of FIG. 7B. Hence, only the sub-rate signal "a" written into a position corresponding to the first four bits of the time slot "16" in the speech path memory 2 is twice read out from the speech path memory 2, and the input channel signal shown in (f) of FIG. 7B is obtained. The channel "16" has two identical sub-rate signals "a".

During a time corresponding to the input channel "17", the input time slot number "16" is read out from the control memory 4, and input to the speech memory 2. During this operation, the bit "2" of the ROM 51 is maintained at "1". Thus, the address consisting of the three low-order bits applied to the speech path memory 2 changes twice in the order of "4", "5", "6" and "7", as shown in (d) of FIG. 7B. That is, a pattern of "4", "5", "6" and "7" appears twice during the input channel "17". Thus, the sub-rate signal "b" written in a position corresponding to the second four bits of the time slot "16" is twice read out from the speech path memory 2. In the above manner, the two sub-rate signals in each of the input time slots "16", "18", "20", . . . on the write side are placed in two different input channels (16, 17), (18, 19), (20, 21), . . . . The input channel signal shown in (f) of FIG. 7B is input to the secondary time switch 7.

Figure 7C:
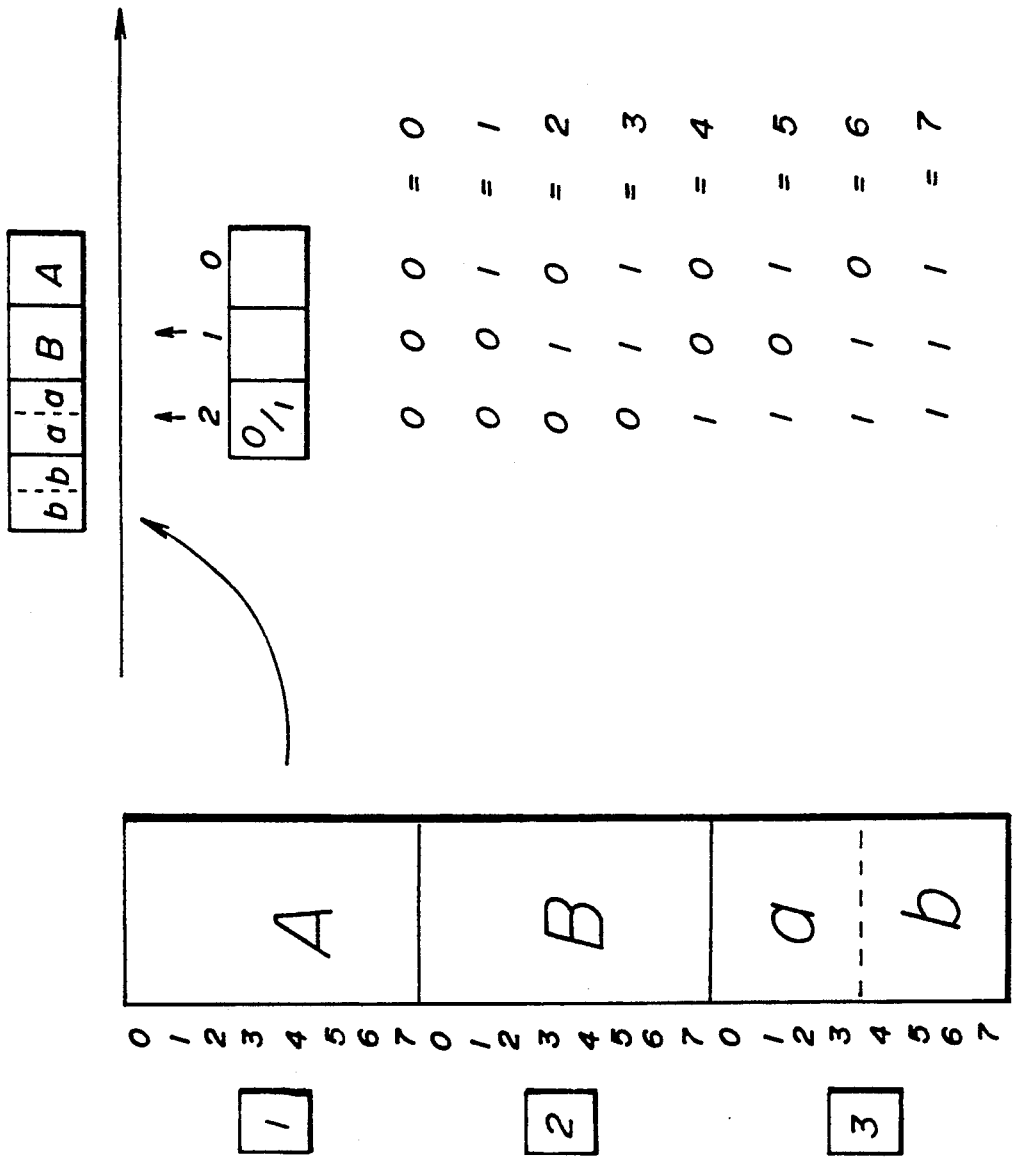
FIG. 7C is a diagram showing the read operation of the primary switch shown in FIG. 7A.
Figure 8:
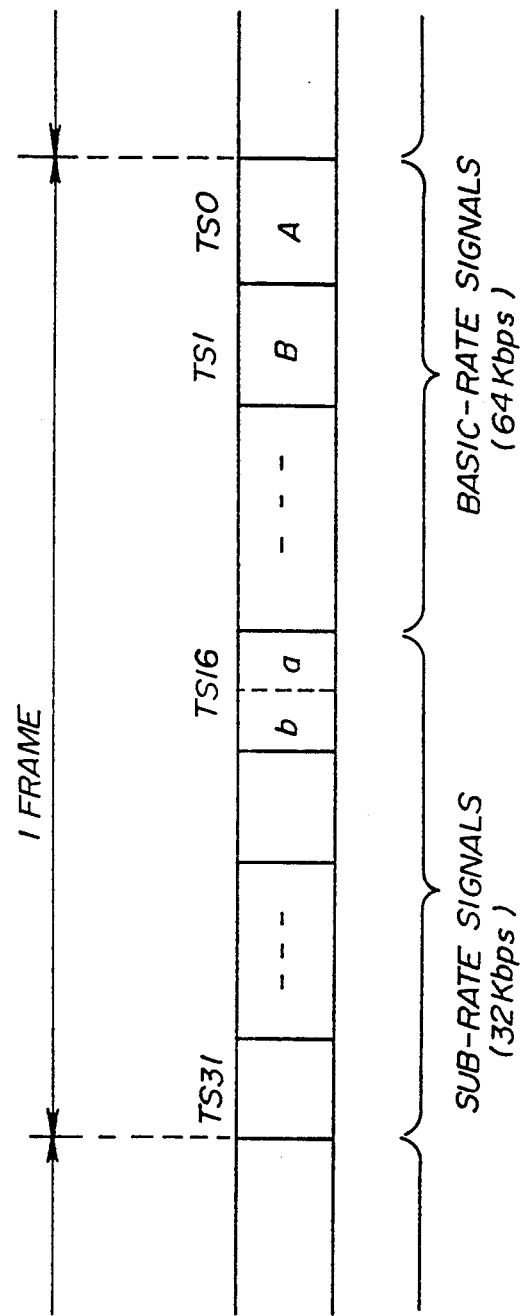
FIG. 8 is a diagram of a input time slot signal.

FIG. 7C shows a decoding (decompressing) operation of the primary time switch (SW0) 1 shown in FIG. 7A. For the sake of simplicity, the input time slot signal consists of four time slots.

Figure 9A:
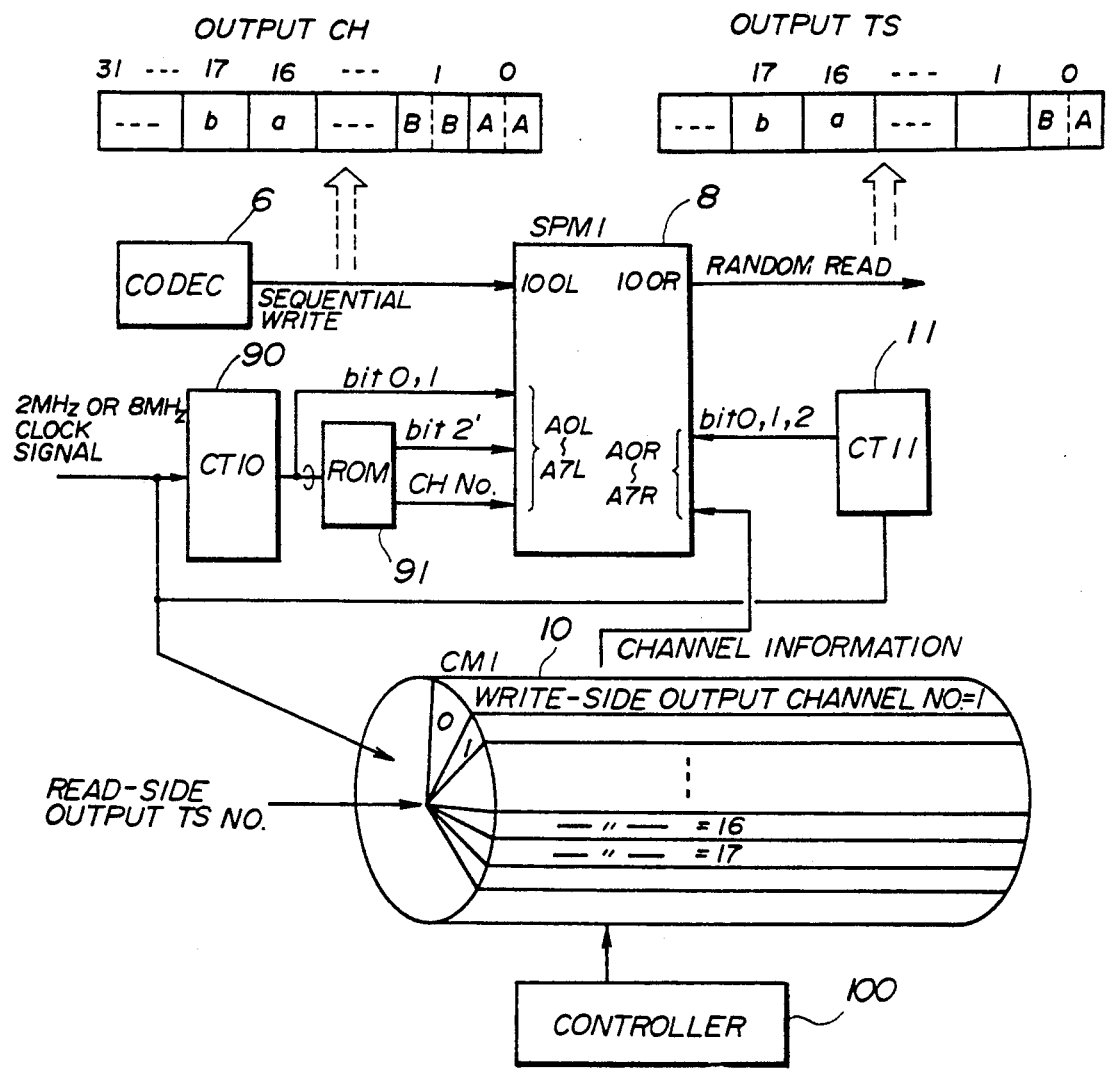
FIG. 9A is a block diagram of a secondary time switch shown in FIG. 6.

The secondary time switch (SW1) 7 will now be described with reference to FIG. 9A. The write address generator 9 shown in FIG. 9A is composed of a counter (CT10) 90 and a ROM 91. The output channel signal ("OUTPUT CH") which is output by the codec 6 has 32 channels, as shown in FIG. 9A. Each of the first 16 channels "0"–"15" out of the 32 channels includes two identical sub-rate (32 kbps) signals such as AA or BB, and each of the second 16 channels "16"–"31" includes a basic-rate signal, such as "a" or "b".

FIG. 9B shows the operation of the secondary time switch 7 shown in FIG. 9A. The counter 90 counts the 2 MHz (or 8 MHz) clock signal, and generates bits "0", "1", "2" and "7", as shown in (a) of FIG. 9B. The other bits "3"–"6" are omitted from FIG. 9B for the sake of simplicity. The bits "0" and "1" from the counter 90 are directly supplied to the speech path memory 8, while the bit "2" and the bits "3"–"7" indicating the channel number are supplied to the ROM 91. During the period when the counter 90 has a count numeral which is any of the channels "0"–"15" and an even channel is being processed, the ROM 91 generates an output signal which indicates an odd channel obtained by adding +1 to the even channel, as shown in (d) of FIG. 9B. The output signal of the ROM 91 serves as the write address of the speech path memory 8 (address of the channel number). When the counter 90 has an odd channel, this indicates the channel number to be accessed, while the bit "2" is changed to a bit "2'", as shown in (b) of FIG. 9B. That is, when the counter 90 has an odd channel prior to the channel "16", the bit "2'" is maintained at "1". When the counter 90 indicates an even channel ("0", "2", "4", ... ), the bit "2'" is the same as the bit "2".

The output channel signal shown in FIG. 9B from the codec 6 is input to the speech path memory (SBM1) 8, and the eight bits of the channel "0" in the output channel signal are sequentially written into the area assigned to the channel "1" of the speech path memory 8. The first four bits of the channel "1" subsequent to the channel "0" are overwritten into the second four bits (bits "4"-"7") of the area of the channel "1" two times, as shown in (c) of FIG. 9, because the bit "2'" from the ROM 91 is "1". In this manner, the sub-rate signal A is written into the first four-bit area of the speech path memory 8 related to the channel "1", and the sub-rate signal B is written into the second four-bit area thereof related to the channel "1".

Figure 9C:
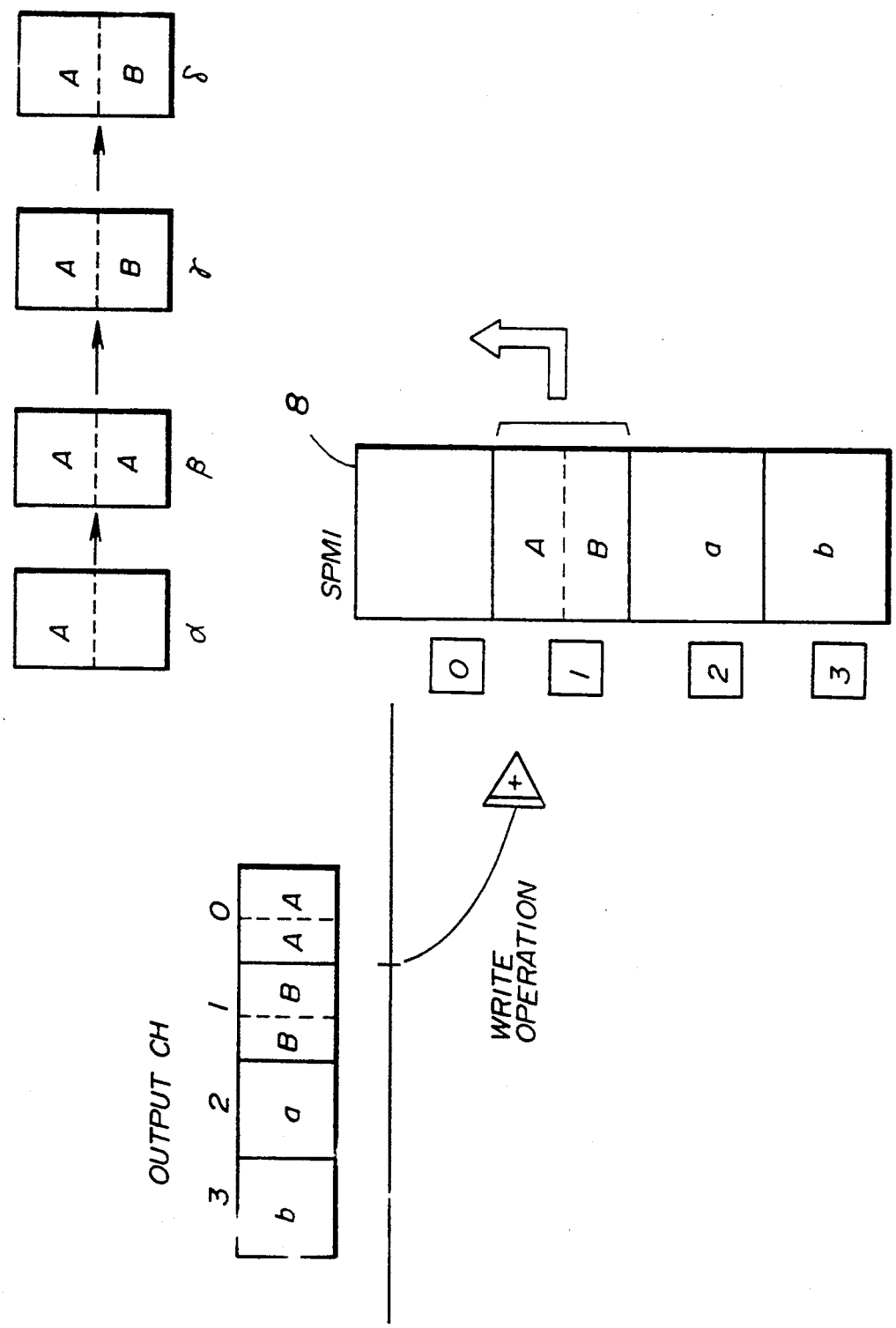
FIG. 9C is a diagram showing the write operation of the secondary switch shown in FIG. 9A.

FIG. 9C shows a coding (compressing) operation of the secondary time switch 7 shown in FIG. 9A, in which a 64-kbps signal is generated from the 32-kbps signals A and B. For the sake of simplicity, the output channel signal consists of four channels. Four periods α, β, γ, and δ are defined as shown in (f) of FIG. 9B. During the period α, only the sub-rate signal A is written into the first four bits of the eight-bit area of the speech path memory 8 related to the address (channel) "1". In the same manner as described above, the contents of the eight-bit area specified by the address "1" are A/A, A/B and A/B during the periods β, γ, and δ, respectively where A/A means that the first four bits are A and the second four bits are A. During the period δ, the sub-rate signals A and B are placed in one time slot on the output side of the speech path memory 8. The signals of the channels "2" and "3" are written into the area related to the channels "2" and "3" of the speech path memory 8. In the above manner, signals of up to the channel "15" of the output channel signal are written into the speech path memory 8.

The signals of the channels "16"-"31" of the output channel signal are written into areas related to the channels "16"-"31" of the speech path memory 8, respectively.

Data is read out from the speech path memory 8 by reading the contents of the control memory 10 in accordance with the output time slot numbers. The contents of the control memory 10 are written therein by the software control procedure of the controller 100 shown in FIG. 9A. In FIG. 9B, the contents of the channel "1" of the speech path memory 8 (the combined sub-rate signals A and B) are read out from the speech path memory 8 during the output time slot "0", as shown in (e) of FIG. 9B. During the time slot "1", no data is read out from the speech path memory 8. In this manner, the combined sub-rate signals are read out from the speech path memory 8 by reading the contents of the control memory. During the output time slots 16-31, the contents of the areas of the speech path memory 8 related to the channels 16-31 are read out from the speech path memory 8, respectively.

It is also possible to write the sub-rate signals in the even channel numbers of the speech path memory 8 by reading the contents of the control memory.

A description will now be given of a second preferred embodiment of the present invention. The second embodiment of the present invention handles a basic-rate signal having a bit rate of 16 kbps and a sub-rate signal having a bit rate of 16 kbps which is a quarter of the basic bit rate.

Figure 10A:
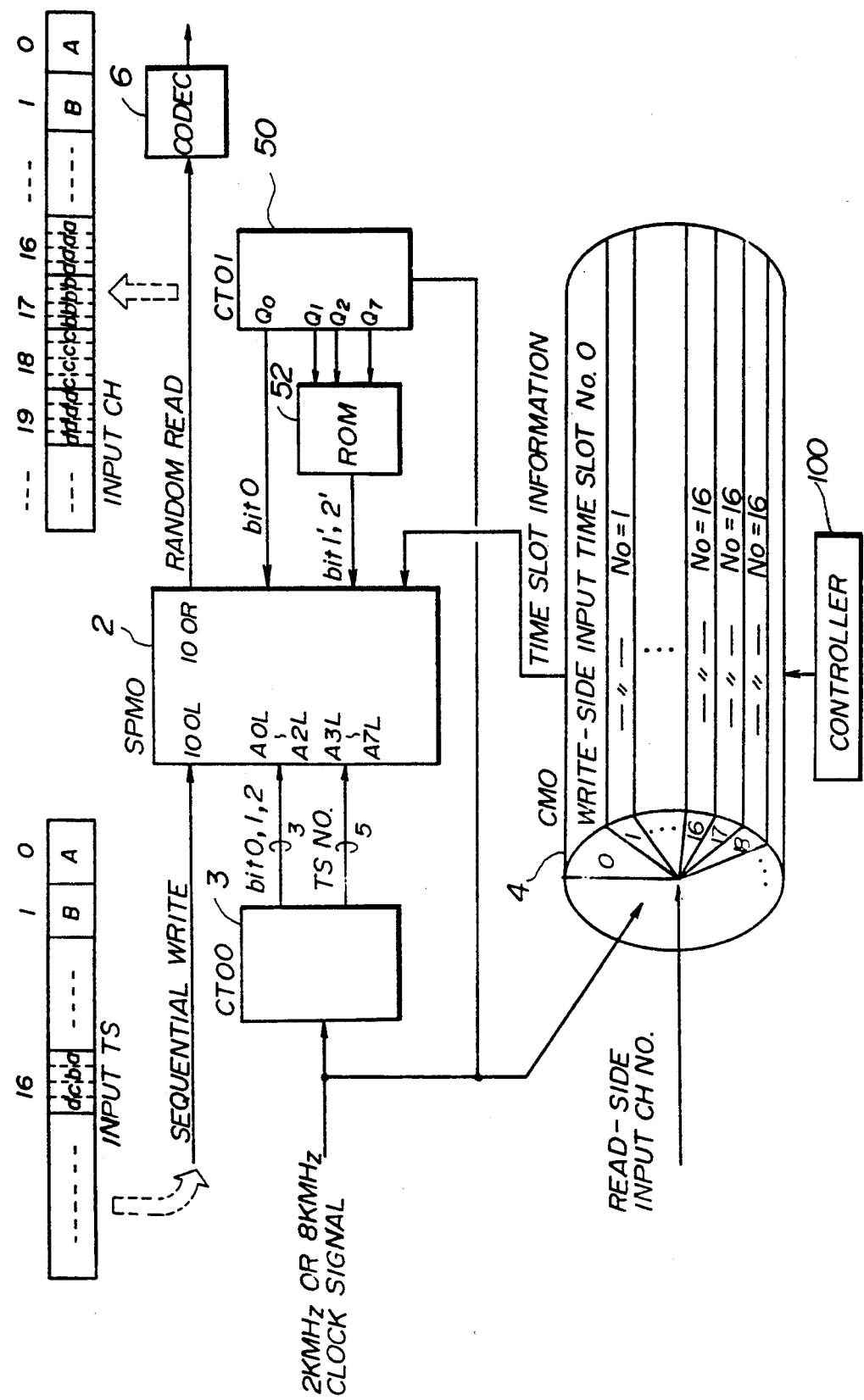
FIG. 10A is a block diagram of a primary time switch according to a second preferred embodiment of the present invention.

FIG. 10A shows a primary time switch used in the second embodiment of the present invention. The structure shown in FIG. 10A is different from that shown in FIG. 7A in that the input time slot signal which is input to the speech path memory 2 includes time slot "16" in which four sub-rate signals "a", "b", "c" and "d" are combined and such a time slot is included for every four time slots, such as "20" and "24". Further, in order to read each of the four sub-rate signals, the read address generator 5 (FIG. 6) is composed of the counter 50 and a ROM 52.

The operation of the primary time switch shown in FIG. 10A is shown in FIG. 10B. An input time slot signal shown in FIG. 10A is input to the speech path memory 2. When the channel "16" of the input channel signal on the read side of the speech path memory 2 is specified during the read operation, the time slot "16" on the write side (in which the sub-rate signals "a"-"d" are written) is specified by the control memory 4. At this time, bits "1", "2" and "7", out of the bits output by the counter 50, are input to the ROM 52, which generates bits "1'" and "2'", as shown in (b) of FIG. 10B. Thus, by the three low-order bits of the read address of the speech path memory 2, bits "0" and "1" of the time slot 16 (two bits of the sub-rate signal "a") are repeatedly (four times) read out from the speech path memory 2, as shown in (c) and (e) of FIG. 10B.

While the channel "17" of the input channel signal is specified, the control memory 4 specifies the time slot "16" in the same way as described above. During this time, the three low-order bits includes bit "1'" which is set to "1". Thus, bits "2" and "3" of the time slot 16 (two bits of the sub-rate signal "b") are repeatedly read out from the speech path memory 2, as shown in (c) and (e) of FIG. 10B.

In the same way as described above, the sub-rate signals "c" and "d" are read out from the speech path memory 2 when the channels "18" and "19" of the input speech signal are specified. As a result, the sub-rate signals "a", "b", "c" and "d" are respectively read out from the speech path memory 2 during the channels "16", "17", "18" and "19" of the input speech signal.

Figure 11A:
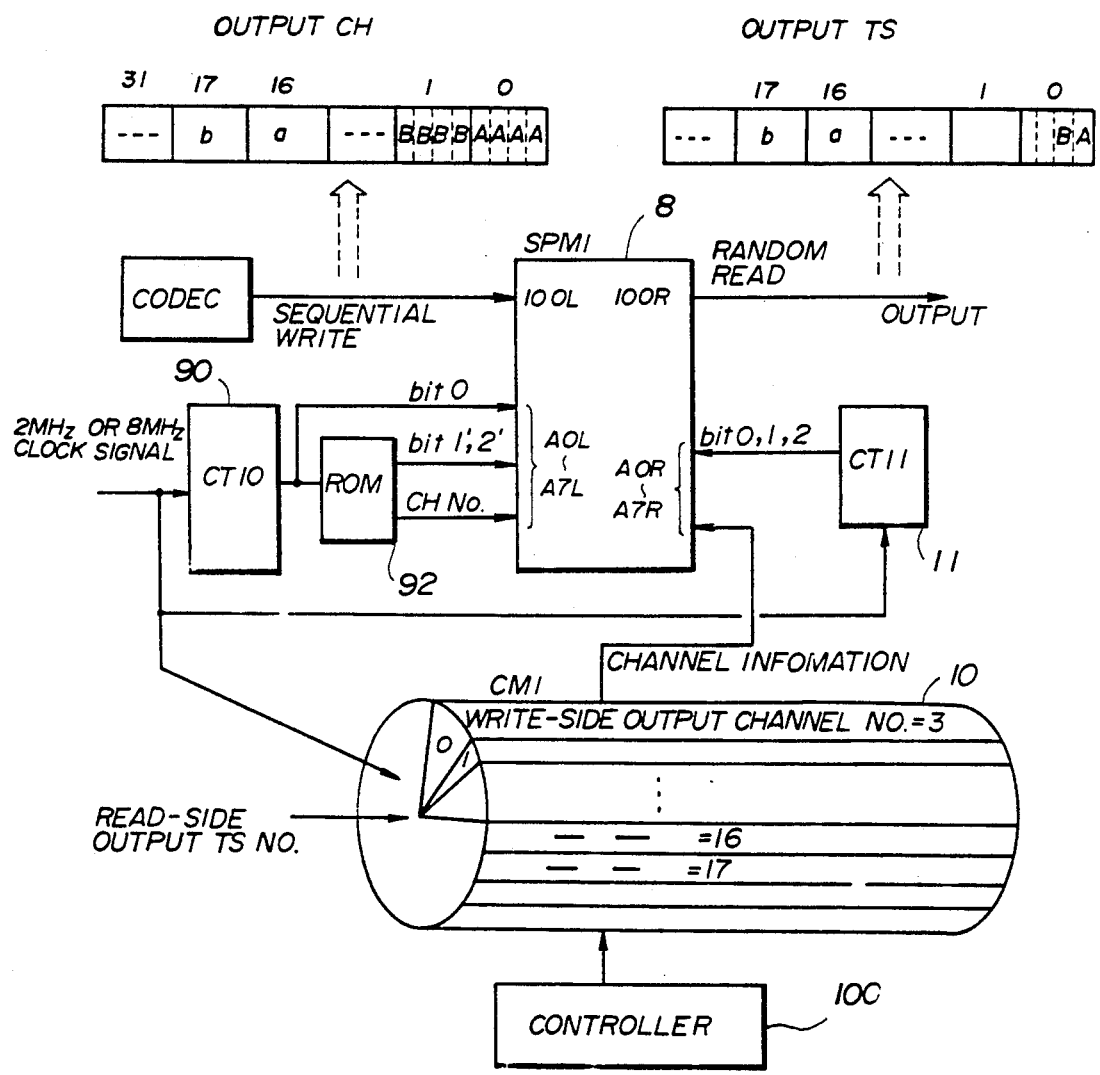
FIG. 11A is a block diagram of a secondary time switch according to the second embodiment of the present invention.

FIG. 11A shows the structure of a secondary time switch used in the second embodiment of the present invention, and FIG. 11B shows the operation of the secondary time switch shown in FIG. 11A. The write address generator is composed of the counter 90 and a ROM 92. The sub-rate signals A-D are positioned in the channels "0"-"3" of the output channel signal, as shown in (b) of FIG. 11B. During the time when the sub-rate signals A-D are written into the speech path memory 8, the write address (including bits "1'" and "2'"), which is the same as the read address shown in FIG. 10A, is generated by the ROM 92. In this case, the write position of the speech path memory 8 in which the contents of the channels "0"-"3" of the output channel signal are written is the channel number "3" of the speech path memory 8 (ROM 92 generates odd channel numbers which are separated from each other by four channels, such as "7" and "11").

Thus, as shown in (d) of FIG. 11B, the identical sub-rate signals A of the channel "0" of the output channel signal are repeatedly written (overwritten) into the areas specified by bits "0" and "1" of the channel number "3" of the speech path memory 8. The identical sub-rate signals B of the channel "1" of the output channel signal are repeatedly written into the areas specified by bits "2" and "3" of the channel number "3" of the speech path memory 8. In the same way as described above, the identical sub-rate signals C of the channel "1" of the output channel signal are repeatedly written into the areas specified by bits "4" and "5" of the channel number "3" of the speech path memory 8, and the identical sub-rate signals D of the channel "1" are repeatedly written into the areas specified by bits "6" and "7".

During the read operation of the secondary time switch shown in FIG. 11A, the sub-rate signals A-D written into the area specified by the channel number "3" of the speech path memory 8 are sequentially specified by the control memory 10 during the time slot "0" of the output time slot signal. In this manner, the output time slot signal shown in (e) of FIG. 11B is obtained.

It is possible to write an area of the speech path memory 8 corresponding to one of the channel numbers "0", "1" and "2" instead of channel number "3". It is also possible to handle an 8 kbps sub-rate signal in the same way as described above.

Figure 12:
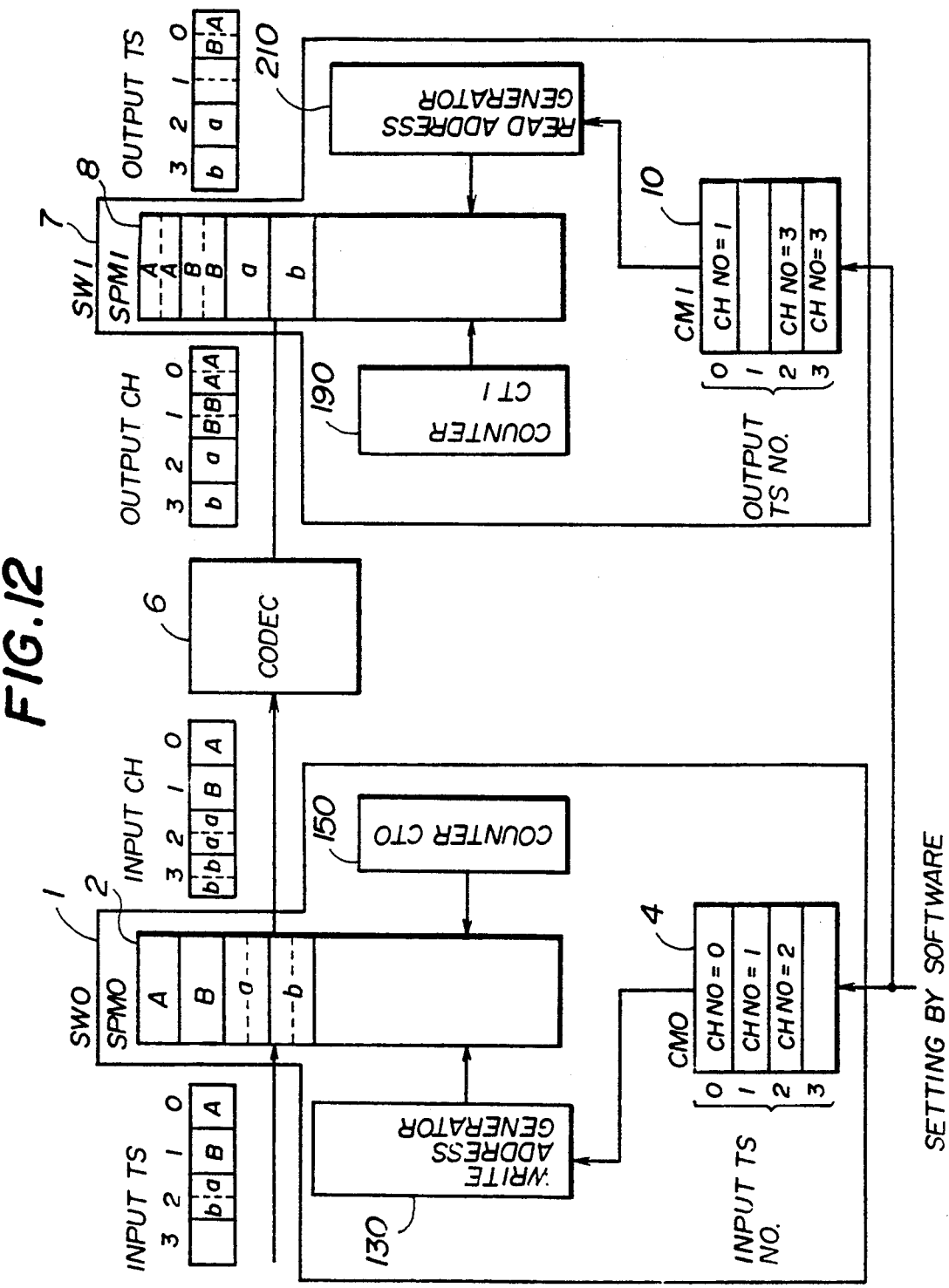
FIG. 12 is a block diagram of an outline of a third preferred embodiment of the present invention.

FIG. 12 shows a third preferred embodiment of the present invention. A write address generator 130 controlled by the control memory 4 is provided on the input (write) side of the speech path memory 2 of the primary time switch 1. The contents of the time slots of the input time slot signal are written into the speech path memory 2 in accordance with addresses generated by the write address generator 130. The contents of the speech path memory 2 are sequentially read out therefrom in accordance with addresses generated by a counter ("CT0") 150 provided on the output (read) side of the speech path memory 2. A counter ("CT1") 190 is provided on the input (write) side of the speech path memory 8 of the secondary time switch 7. The contents of the channels of the output channel signal from the codec 6 are sequentially written into the speech path memory 8. A read address generator 210 controlled by the control memory 10 is provided on the output (read) side of the speech path memory 8. The contents of the speech path memory 8 are read out therefrom by addresses generated by the read address generator 210.

Figure 13A:
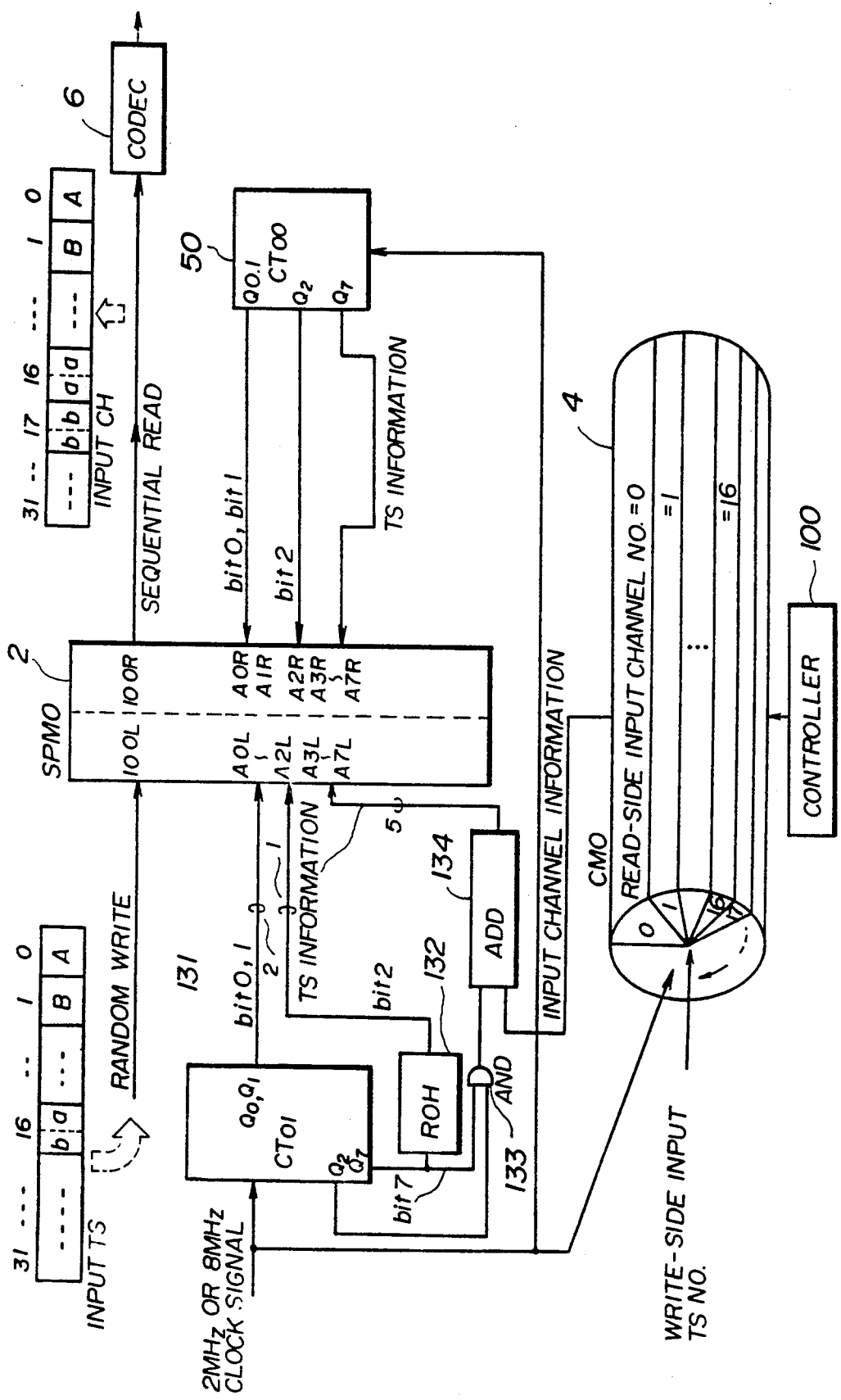
FIG. 13A is a block diagram of a primary time switch shown in FIG. 12.

FIG. 13A shows the primary time switch 1 shown in FIG. 12. As shown, the write address generator 130 shown in FIG. 12 is composed of a counter (CT01) 131, a ROM 132, an AND gate 133 and an adder 134. Bits "0" and "1" of the counter 131 are directly input to the speech path memory 2. Bit "7" of the counter 131 is input to the ROM 132, which generates bit "2". The AND gate 133 receives bits "2" and "7" of the counter 131. An output signal of the AND gate 133 is maintained at "0" during each of the channels "0"–"15" of the input channel signal, as shown in (f) of FIG. 13B, which shows the write timings. Further, the output signal of the AND gate 133 is maintained at "0" during the first half of the period of each of the channels "16"–"31" and maintained at "1" during the second half thereof. The output signal of the AND gate 133 is input to the adder 134, which adds the received output signal of the AND gate 133 to the channel number of the input channel signal generated by the control memory 4, as shown in (g) of FIG. 13B.

During each of the channels "0"–"15", the channel number of the input channel signal read out from the control memory 4 passes through the adder 134 and is input to the speech path memory 2. During the first half of the period of each of the channels "16"–"31", the adder 134 outputs the channel number of the input channel signal read out from the control memory 4 to the speech path memory 2, and during the second half thereof, the adder 134 outputs to the speech path memory a channel number obtained by adding +1 to the channel number of the input channel signal read out from the control memory 4. Thus, the sub-rate signals "a" and "b" stored in the time slot "16" of the input time slot signal are respectively written into the first half of the channel "16" of the input channel signal and the first half of the channel "17" thereof.

Figure 14A:
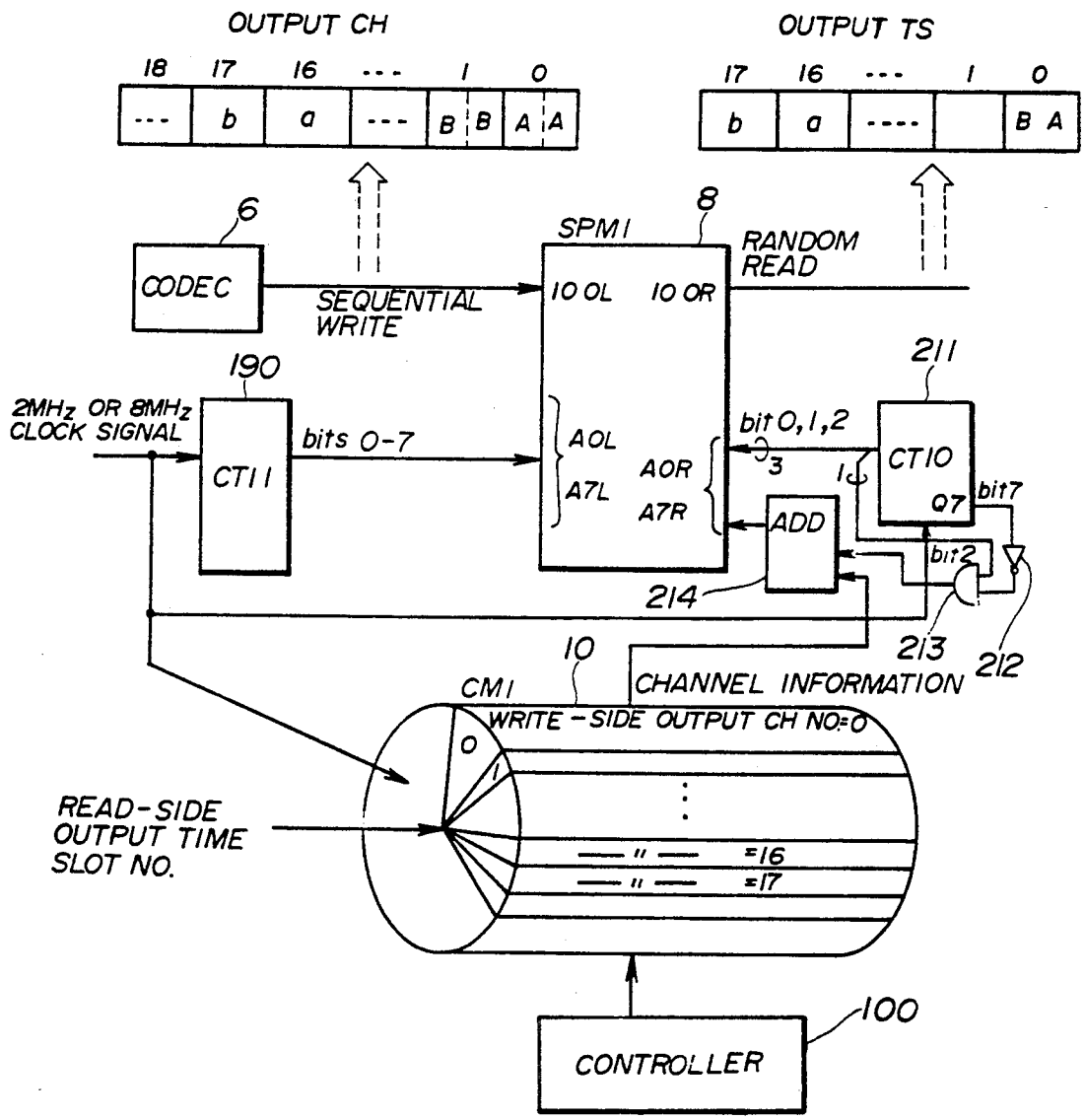
FIG. 14A is a block diagram of a secondary time switch shown in FIG. 12.

FIG. 14A shows the secondary time switch shown in FIG. 12. The counter 190 outputs bits "0"–"7" to the speech path memory 8. Thus, the output channel signal from the codec 6 is sequentially written into the speech path memory 8. The read address generator 210 shown in FIG. 12 is composed of a counter (CT10) 211, an inverter 212, an AND gate 213 and an adder 214. During the read operation, the sub-rate signals placed in different channels, such as A and B, are placed in an identical time slot of the output time slot signal. Bit "7" of the counter 211 is input to the inverter 212, which outputs an inverted version of the bit "7" to the AND gate 213, which also receives bit "2". Bits "0"–"2" are directly input to the speech path memory 8. An output signal of the AND gate 213 changes, as shown in (d) of FIG. 14B. The output signal of the AND gate 213 is related to the sub-rate signals. As shown in (d) of FIG. 14B, during the first half of the period of each of the channels "0"–"15", the AND gate 213 outputs "0", and during the second half thereof, the AND gate 213 outputs "1". During the period of each of the channels "16"–"31", the output signal of the AND gate 213 is maintained at "0".

The adder 214 generates the read address of the speech path memory 8. During the period of each of the channels "16"–"31", the channel number read out from the control memory 10 passes through the adder 214, and is input to the speech path memory 8. As shown in (e) of FIG. 14B, during the first half of each of the channels "0"–"15", the channel number from the control memory 10 is input to the speech path memory 8, and during the second half thereof, the speech path memory 8 receives a channel number obtained by adding +1 to the channel number read out from the control memory 10. Thus, the sub-rate signal A in the channel "0" is read out during the first half period of the output time slot "0", and the sub-rate signal B in the channel "1" is read out during the second half period of the output time slot "1".

In order to obtain the above-mentioned operation, it is possible to use a combination of the primary time switch used in the first embodiment and the secondary time switch used in the third embodiment or a combination of the primary switch used in the third embodiment and the secondary switch used in the first embodiment.

The present invention is not limited to the specifically disclosed embodiments, and variations and modifications may be made without departing from the scope of the present invention.

What is claimed is:

1. A sub-rate time switch for switching a digital multiplexed signal which is input thereto and which has plural time slots, a basic-rate signal being included in a first time slot thereof and N sub-rate signals being included in a second time slot thereof, where N is an integer, each of the sub-rate signals having a sub-rate which is equal to 1/N times a basic rate of the basic rate signal, the sub-rate time switch comprising:

a speech path memory which temporarily stores the digital multiplexed signals, as input to the sub-rate time switch, a channel signal as read out from the speech path memory having plural channels corresponding to the plural time slots of the digital multiplexed signal; and control means, coupled to said speech path memory, for controlling write and read operations of said speech path memory so that said channel signal read out therefrom includes N consecutive channels, each including N identical sub-rate signals, each of said N identical sub-rate signals corresponding to one of said N sub-rate signals included in said second time slot of the digital multiplexed signal, said control means comprising:

write counter means, coupled to said speech path memory, for generating a write address of said speech path memory so that said digital multiplexed signal is sequentially written into said speech path memory, control memory means, coupled to said speech memory, for specifying an area of said speech path memory in which said N sub-rate signals in said second time slot are stored during a time when said N consecutive channels are addressed, and read address generating means, coupled to said speech path memory, for generating a read address indicating one of said N sub-rate signals which is to be repeatedly read out from said speech path memory during a time when one of said N consecutive channels is addressed.

2. A sub-rate time switch as claimed in claim 1, wherein said read address generating means comprises:

read counter means, coupled to said speech path memory, for generating a plurality of address bits comprising said read address; and means for receiving a predetermined number of address bits, of said plurality of address bits, and for generating revised versions of said predetermined number of address bits, said revised versions of the predetermined number of address bits causing said one of said N sub-rate signals to be repeatedly read out from said speech path memory during the time when one of said N consecutive channels is addressed.

3. A sub-rate time switch as claimed in claim 1, wherein said further is operative for generating a read address of said speech path memory so that said N sub-rate signals, included in said second time slot, are separately and respectively located in N consecutive channels of said channel signal and so that the basic-rate signal, included in said first time slot, is placed in a corresponding one of the channels of said channel signal.

4. A sub-rate time switch as claimed in claim 1, wherein the basic rate is 64 kbps.

5. A sub-rate time switch for switching a digital multiplexed signal which is input thereto and which has plural time slots, a basic-rate signal being included in a first time slot thereof and N sub-rate signals being included in a second time slot thereof, where N is an integer, each of the sub-rate signals having a sub-rate which is equal to 1/N times a basic rate of the basic rate signal, the sub-rate time switch comprising:

a speech path memory which temporarily stores the digital multiplexed signals, as input to the sub-rate time switch, a channel signal as read out from the speech path memory having plural channels corresponding to the plural time slots of the digital multiplexed signal; and control means, coupled to said speech path memory, for controlling write and read operations of said speech path memory so that said channel signal read out therefrom includes N consecutive channels, each including N identical sub-rate signals, each of said N identical sub-rate signals corresponding to one of said N sub-rate signals included in said second time slot of the digital multiplexed signal said control means comprising:

write address generating means, coupled to said speech path memory, for generating a write address of said speech path memory so that said N sub-rate signals, included in said second time slot, are separately written into N consecutive areas of said speech path memory corresponding to the plural time slots of said digital multiplexed signal; and read counter means, coupled to said speech path memory, for generating a read address of said speech path memory so that said N sub-rate signals in said N consecutive areas are sequentially read out from said speech path memory.

6. A sub-rate time switch as claimed in claim 5, wherein each of said N consecutive channels is assigned a number in an ordered sequence and wherein said write address generating means comprises:

control memory means, coupled to said speech path memory, for specifying a first area of the speech path memory corresponding to a first one of the N consecutive channels corresponding to said second time slot; and means, coupled to said control memory means, for specifying a second area of the speech path memory corresponding to a second one of the N consecutive channels, subsequent to said first one of the N consecutive channels, by adding a predetermined number to the assigned number of said first one of the channels.

7. A sub-rate time switch for switching a digital multiplexed signal which is input thereto and which has plural channels, including a first channel in which a basic-rate signal having a basic rate is positioned and N consecutive second channels, where N is an integer, each of said N consecutive second channels including N identical sub-rate signals and each of said N identical sub-rate signals having a sub-rate equal to 1/N times the basic rate of the basic rate signal, the sub-rate time switch comprising:

a speech path memory which temporarily stores the digital multiplexed signal, as input to the sub-rate time switch, a time slot signal as read out from the speech path memory having plural time slots corresponding to the plural channels of the digital multiplexed signal; and control means, coupled to said speech path memory, for controlling write and read operations of said speech path memory so that said time slot signal includes a time slot including N sub-rate signals respectively included in the N consecutive second channels, said control means comprising:

write address generating means, coupled to said speech path memory, for generating a write address of said speech path memory so that the N sub-rate signals respectively included in the N consecutive second channels are written into an area of said speech path memory corresponding to a last one of the N consecutive second channels, control memory means, coupled to said speech path memory, for specifying said area of the speech path memory corresponding to the last one of the N consecutive second channels, and read counter means, coupled to said speech path memory, for generating a read address of said speech path memory indicating one of said N sub-rate signals, included in said area of the speech path memory corresponding to the last one of the N consecutive second channels, which is to be read out therefrom.

8. A sub-rate time switch as claimed in claims 7, wherein said write address generating means comprises:

write counter means, coupled to said speech path memory, for generating a plurality of address bits comprising said write address; and means, coupled to said write counter means, for receiving a predetermined number of address bits, of said plurality of address bits, and for generating revised versions of said predetermined number of address bits, said revised versions of the predetermined number of address bits indicating the area corresponding to the last one of the N consecutive second channels, during a time in which said write counter means generates the address bits indicating the N consecutive second channels and indicating write positions in said area in which said N sub-rate signals, respectively included in the N consecutive second channels, are stored.

9. A sub-rate time switch for switching a digital multiplexed signal which is input thereto and which has plural channels, including a first channel in which a basic-rate signal having a basic rate is positioned and N consecutive second channels, where N is an integer, each of said N consecutive second channels including N identical sub-rate signals and each of said N identical sub-rate signals having a sub-rate equal to 1/N times the basic rate of the basic rate signal, the sub-rate time switch comprising:

a speech path memory which temporarily stores the digital multiplexed signal, as input to the sub-rate time switch, a time slot signal as read out from the speech path memory having plural time slots corresponding to the plural channels of the digital multiplexed signal; and control means, coupled to said speech path memory, for controlling write and read operations of said speech path memory so that said time slot signal includes a time slot including N sub-rate signals respectively included in the N consecutive second channels, said control means comprising:

write counter means, coupled to said speech path memory, for generating a write address of said speech path memory so that said digital multiplexed signal is sequentially written into said speech path memory, and read address generating means, coupled to said speech path memory, for generating a read address of said speech path memory so that said time slot signal includes the time slot including the N sub-rate signals respectively included in the N consecutive second channels.

10. A sub-rate time switch as claimed in claim 9, wherein each of said N consecutive channels is assigned a number in an ordered sequence and wherein said read address generating means comprises:

control memory means, coupled to said speech path memory, for specifying an area of said speech path memory corresponding to a highest number one of said N consecutive second channels; and means, coupled to said speech path memory, for specifying consecutive areas of said speech path memory corresponding to (N-1) consecutive second channels out of said N consecutive second channels, other than said highest number one thereof, by sequentially adding a predetermined number to the number of said highest number one of the N consecutive second channels.

11. A sub-rate time switches claimed in claim 7, wherein said control means comprises:

write address generating means, coupled to said speech path memory, for generating a write address of said speech path memory so that said N sub-rate signals are sequentially written into one of the time slots of the time slot signal and N subsequent sub-rate signals, subsequent to said N sub-rate signals, are overwritten into said one of the time slots of the time slot signal; and read address generating means, coupled to said speech path memory, for generating a read address of said speech path memory so that contents of said speech path memory are read out from said speech path memory at random.

12. A sub-rate time switch as claimed in claim 7, wherein the basic rate is 64 kbps.

13. A sub-rate time switch for switching a digital multiplexed signal which is input thereto and which has plural time slots, a basic-rate signal being included in a first time slot thereof and N sub-rate signals being included in a second time slot thereof, where N is an integer, each of the sub-rate signals having a sub-rate which is equal to 1/N times a basic rate of the basic rate signal, the sub-rate time switch comprising:

a first speech path memory which temporarily stores the digital multiplexed signals, as input to the sub-rate time switch, a first channel signal as read out from the speech path memory having plural channels corresponding to the plural time slots of the digital multiplexed signal; and first control means, coupled to said first speech path memory, for controlling write and read operations of said speech path memory so that said first channel signal read out therefrom includes a first channel including the basic-rate signal, and N consecutive second channels, each including N identical sub-rate signals, each of said N identical sub-rate signals corresponding to one of said N sub-rate signals included in said second time slot of the digital multiplexed signal;

codec means for coding the basic-rate signal included in said first channel signal to sub-rate signals and for decoding the sub-rate signals included in said first channel signal into a basic-rate signal, so that a second channel signal is output by said codec means, said second channel signal having a third channel in which a basic-rate signal is positioned, and N consecutive fourth channels, each including N identical sub-rate signals;

a second speech path memory temporarily storing the second channel signal, a time slot signal being read out from the second speech path memory and having a plurality of time slots corresponding to channels of the second channel signal; and second control means, coupled to said second speech path memory, for controlling write and read operations of said speech path memory so that said time slot signal includes a time slot including N sub-rate signals respectively included in the N consecutive fourth channels.

* * * * *

UNITED STATES PATENT AND TRADEMARK OFFICE
CERTIFICATE OF CORRECTION

PATENT NO. : 5,287,350
DATED : February 15, 1994
INVENTOR(S) : ITO et al.

It is certified that error appears in the above-indentified patent and that said Letters Patent is hereby corrected as shown below:

Col. 6, line 32, after "includes" insert --plural (two) respective-- and after "slots" delete "Plural (two) respective".

Col. 15, line 18, change "claims" to --claim--.

Col. 16, line 17, change "switches" to --switch as--.

Signed and Sealed this

Eighteenth Day of October, 1994

Attest:

BRUCE LEHMAN

Attesting Officer          Commissioner of Patents and Trademarks